(12) United States Patent
Umehara

(10) Patent No.: US 10,171,568 B2
(45) Date of Patent: Jan. 1, 2019

(54) SELECTING SYSTEM, COMMUNICATION MANAGEMENT SYSTEM, COMMUNICATION SYSTEM, COMPUTER PROGRAM, AND METHOD OF SELECTION

(71) Applicant: Naoki Umehara, Kanagawa (JP)

(72) Inventor: Naoki Umehara, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 245 days.

(21) Appl. No.: 15/032,674

(22) PCT Filed: Nov. 28, 2014

(86) PCT No.: PCT/JP2014/080989
§ 371 (c)(1),
(2) Date: Apr. 28, 2016

(87) PCT Pub. No.: WO2015/072581
PCT Pub. Date: May 21, 2015

(65) Prior Publication Data
US 2016/0255141 A1 Sep. 1, 2016

(30) Foreign Application Priority Data

Nov. 18, 2013 (JP) .................................. 2013-237616
Oct. 7, 2014 (JP) .................................. 2014-206251

(51) Int. Cl.
*G06F 15/173* (2006.01)
*H04L 29/08* (2006.01)
(Continued)

(52) U.S. Cl.
CPC .......... *H04L 67/1004* (2013.01); *G06F 9/505* (2013.01); *G06F 9/5083* (2013.01); *H04L 65/1066* (2013.01); *H04M 3/56* (2013.01)

(58) Field of Classification Search
CPC ............. H04L 67/1004; H04L 65/1066; H04L 29/08; H04L 29/06; G06F 9/505; G06F 9/5083
See application file for complete search history.

(56) References Cited

U.S. PATENT DOCUMENTS 6,128,644 A * 10/2000 Nozaki ................... G06F 9/505
709/201
6,128,657 A    10/2000 Okanoya et al.
(Continued)

FOREIGN PATENT DOCUMENTS

CN    101013388 A    8/2007
CN    101339523 A    1/2009
(Continued)

OTHER PUBLICATIONS

Extended Search Report dated Oct. 5, 2016 in European Patent Application No. 14861890.3.
(Continued)

*Primary Examiner* — Benjamin M Thieu
(74) *Attorney, Agent, or Firm* — Oblon, McClelland, Maier & Neustadt, L.L.P.

(57) ABSTRACT

A selecting system selects, among controllers controlling a session between communication terminals, a controller to be connected to a communication terminal. The selecting system includes a state management unit, a load management unit, an accepting unit, a calculating unit, and a selecting unit. The state management unit manages, for each controller, state information indicating a state of communication of a communication terminal connected to the controller. The load management unit manages, for each state of communication, load information indicating a degree of load. The accepting unit accepts a connection request to the controller from a communication terminal not connected to the controller. The calculating unit calculates, for each controller, the degree of load related to the control based on the state
(Continued)

information and the load information. The selecting unit selects a controller to be connected to the communication terminal as a connection requester terminal based on the degree of load.

14 Claims, 30 Drawing Sheets

(51) Int. Cl.
*G06F 9/50* (2006.01)
*H04L 29/06* (2006.01)
*H04M 3/56* (2006.01)

(56) References Cited

U.S. PATENT DOCUMENTS

| | | | |
|---|---|---|---|
| 2003/0236888 A1 | 12/2003 | Chauffour et al. | |
| 2004/0024853 A1 | 2/2004 | Cates et al. | |
| 2005/0102674 A1* | 5/2005 | Tameshige | G06F 9/5011 718/100 |
| 2007/0220028 A1* | 9/2007 | Hikawa | G06F 9/505 |
| 2010/0042675 A1* | 2/2010 | Fujii | G06F 9/505 709/203 |
| 2012/0044532 A1* | 2/2012 | Takahasi | G06F 9/5083 358/1.15 |
| 2012/0084788 A1* | 4/2012 | Sakamoto | G06F 9/5083 718/105 |
| 2012/0204176 A1* | 8/2012 | Tian | G06F 9/505 718/1 |
| 2012/0314019 A1 | 12/2012 | Asai | |
| 2013/0117373 A1 | 5/2013 | Umehara | |
| 2013/0227585 A1* | 8/2013 | Ichikawa | G06F 9/50 718/104 |
| 2013/0242038 A1 | 9/2013 | Umehara et al. | |
| 2014/0078245 A1 | 3/2014 | Umehara et al. | |
| 2015/0077505 A1 | 3/2015 | Umehara | |
| 2015/0092012 A1 | 4/2015 | Umehara | |
| 2015/0130890 A1 | 5/2015 | Umehara | |
| 2015/0138306 A1 | 5/2015 | Umehara | |
| 2015/0149635 A1* | 5/2015 | Rajagopalan | H04L 67/1014 709/226 |
| 2015/0256998 A1 | 9/2015 | Umehara | |
| 2016/0127204 A1* | 5/2016 | Ozaki | H04L 43/04 709/224 |

FOREIGN PATENT DOCUMENTS

| | | |
|---|---|---|
| JP | 2005-269434 | 9/2005 |
| JP | 2008-071156 | 3/2008 |
| JP | 2011-077630 | 4/2011 |
| JP | 2011-077838 A | 4/2011 |
| JP | 2011-199845 | 10/2011 |
| JP | 2012-050063 | 3/2012 |
| JP | 2013-243469 | 12/2013 |
| JP | 2013-243470 | 12/2013 |
| JP | 2013-243471 | 12/2013 |
| JP | 2013-243472 | 12/2013 |
| JP | 2014-017825 | 1/2014 |
| JP | 2015-092651 | 5/2015 |

OTHER PUBLICATIONS

Combined Office Action and Search Report dated Jan. 17, 2018 in Chinese Patent Application No. 201480062561.2 (with English language translation), 12 pages.
International Search Report dated Feb. 10, 2015 in PCT/JP2014/080989 filed on Nov. 18, 2014.
Office Action dated Aug. 7, 2018, in corresponding Japanese Patent Application No. 2014-206251, 47 pages.

* cited by examiner

FIG.8

STATE MANAGEMENT TABLE

| TERMINAL ID/DOMAIN INFORMATION | STATE INFORMATION |
|---|---|
| 01ac@jp1.oo.com | None |
| ... | ... |
| 01bb@jp2.oo.com | Busy |
| ... | ... |
| 01ad@jp1.oo.com | None |
| ... | ... |
| 01bc@jp2.oo.com | Busy |
| ... | ... |

FIG.9

LOAD MANAGEMENT TABLE

| STATE INFORMATION | LOAD INFORMATION |
|---|---|
| None | 1 |
| Inviting | 2 |
| Invited | 2 |
| Calling | 2 |
| Ringing | 2 |
| Accepted | 2 |
| Busy | 3 |

FIG.10A

RELAYING APPARATUS MANAGEMENT TABLE

| RELAYING APPARATUS ID | PASSWORD |
|---|---|
| 111a@jp.oo.com | xxxx |
| 111b@jp.oo.com | yyyy |

FIG.10B

RELAYING APPARATUS MANAGEMENT TABLE

| RELAYING APPARATUS ID | PASSWORD |
|---|---|
| 111c@us.oo.com | xyxy |
| 111d@us.oo.com | zyzy |

FIG.11A

TERMINAL AUTHENTICATION
MANAGEMENT TABLE

| TERMINAL ID | PASSWORD |
|---|---|
| 01aa | aaaa |
| 01ab | abab |
| 01ba | baba |
| ... | ... |

FIG.11B

TERMINAL AUTHENTICATION
MANAGEMENT TABLE

| TERMINAL ID | PASSWORD |
|---|---|
| 01ca | cccc |
| 01cb | cdcd |
| 01da | dcdc |
| ... | ... |

FIG.12A

DESTINATION LIST MANAGEMENT TABLE

| TERMINAL ID | |
|---|---|
| REQUEST SOURCE | DESTINATION |
| 01aa | 01ab<br>01bb<br>01bd<br>01cb<br>01db |
| 01ab | 01aa<br>01ca<br>01cb<br>01cc |
| ... | ... |

FIG.12B

DESTINATION LIST MANAGEMENT TABLE

| TERMINAL ID | |
|---|---|
| REQUEST SOURCE | DESTINATION |
| 01ca | 01aa<br>01ba<br>01cb<br>01db |
| 01cb | 01aa<br>01ca<br>01cc |
| ... | ... |

FIG.13A

SESSION MANAGEMENT TABLE

| SESSION ID | RELAYING APPARATUS ID | TERMINAL ID |
|---|---|---|
| se01@jp.oo.com | 111a@jp.oo.com | 01aa@jp1.oo.com, 01bd@jp2.oo.com |
| se02@jp.oo.com | 111b@jp.oo.com | 01ad@jp1.oo.com |
| ... | ... | ... |

FIG.13B

SESSION MANAGEMENT TABLE

| SESSION ID | RELAYING APPARATUS ID | TERMINAL ID |
|---|---|---|
| se51@us.oo.com | 111c@us.oo.com | 01da@us2.oo.com, 01cc@us1.oo.com |
| se52@us.oo.com | 111b@us.oo.com | 01de@us2.oo.com |
| ... | ... | ... |

FIG.14A

STATE CHANGE MANAGEMENT TABLE (Call, Join, Leave)

| MANAGEMENT INFORMATION | PRE-CHANGE STATE INFORMATION | POST-CHANGE STATE INFORMATION |
|---|---|---|
| Call | None | Accepted |
| Join | Accepted | Busy |
| Leave | Busy | None |

FIG.14B

STATE CHANGE MANAGEMENT TABLE (Invite, Accept)

| MANAGEMENT INFORMATION | TERMINAL INFORMATION | PRE-CHANGE STATE INFORMATION | POST-CHANGE STATE INFORMATION |
|---|---|---|---|
| Invite | TRANSMISSION SOURCE | None | Inviting |
| | TRANSMISSION DESTINATION | None | Invited |
| Ring | TRANSMISSION DESTINATION | Inviting | Calling |
| | TRANSMISSION SOURCE | Invited | Ringing |
| Accept | TRANSMISSION DESTINATION | Calling | Accepted |
| | | Accepted | Accepted |
| | TRANSMISSION SOURCE | Ringing | Accepted |

FIG.15

RELAYING APPARATUS SELECTION
MANAGEMENT TABLE

| RELAYING APPARATUS ID | TERMINAL ID | PRIORITY |
|---|---|---|
| 111a@jp.oo.com | 01aa | 3 |
| | ... | ... |
| | 01bd | 2 |
| | ... | ... |
| 111b@jp.oo.com | 01aa | 1 |
| | ... | ... |
| | 01bd | 2 |
| | ... | ... |
| 111c@us.oo.com | 01aa | 1 |
| | ... | ... |
| | 01bd | 1 |
| | ... | ... |
| 111d@us.oo.com | 01aa | 1 |
| | ... | ... |
| | 01bd | 1 |
| | ... | ... |

FIG.16

TERMINAL MANAGEMENT TABLE

| TERMINAL ID | DESTINATION NAME | OPERATION STATE |
|---|---|---|
| 01aa@jp1.oo.com | TOKYO OFFICE AA TERMINAL | OFFLINE |
| 01ad@jp1.oo.com | TOKYO OFFICE AD TERMINAL | OFFLINE |
| ... | ... | ... |
| 01bb@jp2.oo.com | OSAKA OFFICE BB TERMINAL | ONLINE (IN CONFERENCE) |
| 01bc@jp2.oo.com | OSAKA OFFICE BC TERMINAL | ONLINE (IN CONFERENCE) |
| ... | ... | ... |

SELECTING SYSTEM, COMMUNICATION MANAGEMENT SYSTEM, COMMUNICATION SYSTEM, COMPUTER PROGRAM, AND METHOD OF SELECTION

TECHNICAL FIELD

The present invention relates to a selecting system, a communication management system, a communication system, a computer program, and a method of selection.

BACKGROUND ART

Recently, communication systems performing communication via communication networks such as the Internet have become widespread along with requests for reductions in business trip expenses and business trip times. Such a communication system establishes a session for transmitting and receiving content data such as image data and voice data between communication terminals, thereby achieving communication between the communication terminals.

It is known that IP phone communication systems perform, when establishing a session between communication terminals, control in accordance with the state of a communication terminal in order to appropriately performing connection between the communication terminals. For example, communication terminals perform processing that causes a caller communication terminal to output a sound indicating being busy when an opposite communication terminal is busy and causes the caller communication terminal to output a dial tone when the opposite communication terminal is in a standby state.

In teleconference communication systems, it is known that a teleconference management system controls a session between communication terminals (refer to Patent Literature 1). In this case, a plurality of teleconference terminals are connected to one teleconference management system, and based on a request from each of the teleconference terminals, the teleconference management system controls the session. Owing to this, when the number of the teleconference terminals connected to the teleconference management system increases, a large load related to the control is imposed on the teleconference management system.

As a method for distributing a load imposed on a server, a method is disclosed that selects a server that performs processing out of a plurality of servers (refer to Patent Literature 2). According to this disclosure, each of the servers determines which of the server and another server is to perform processing in response to a processing request from a client, based on the load of the server and the load of the other server.

However, a load imposed on a controller that controls a session between communication terminals changes in accordance with situations, and a problem arises in that, when a controller to be connected to a communication terminal is selected out of a plurality of controllers, an attempt to distribute the load by selecting a controller with a smaller load requires complicated processing such as measuring the load of each of the controllers for each selection.

SUMMARY OF THE INVENTION

According to an embodiment, when a plurality of controllers that control a session between communication terminals are provided, a selecting system selects a controller to be connected to a communication terminal out of the controllers. The selecting system includes a state management unit, a load management unit, an accepting unit, a calculating unit, and a selecting unit. The state management unit manages, for each of the controllers, state information indicating a state of communication of a communication terminal connected to the controller. The load management unit manages, for each state of communication, load information indicating a degree of load related to control to be performed in the corresponding state of communication. The accepting unit accepts a connection request to the controller from a communication terminal that is not connected to the controller. The calculating unit calculates, for each of the controllers, the degree of load related to the control based on the state information managed by the state management unit and the load information managed by the load management unit. The selecting unit selects a controller to be connected to the communication terminal as a connection requester terminal based on the degree of load calculated for each of the controllers by the calculating unit.

BRIEF DESCRIPTION OF DRAWINGS

FIG. 8 is a conceptual diagram illustrating a state management table.

FIG. 9 is a conceptual diagram illustrating a load management table.

FIGS. 10A and 10B are conceptual diagrams illustrating relaying apparatus management tables.

FIGS. 11A and 11B are conceptual diagrams illustrating terminal authentication management tables.

FIGS. 12A and 12B are conceptual diagrams illustrating destination list management tables.

FIGS. 13A and 13B are conceptual diagrams illustrating session management tables.

FIGS. 14A and 14B are conceptual diagrams illustrating state change management tables.

FIG. 15 is a conceptual diagram illustrating a relaying apparatus selection management table.

FIG. 16 is a conceptual diagram illustrating terminal management tables.

DESCRIPTION OF EMBODIMENTS

Overall Structure of Embodiment

Figure 1:
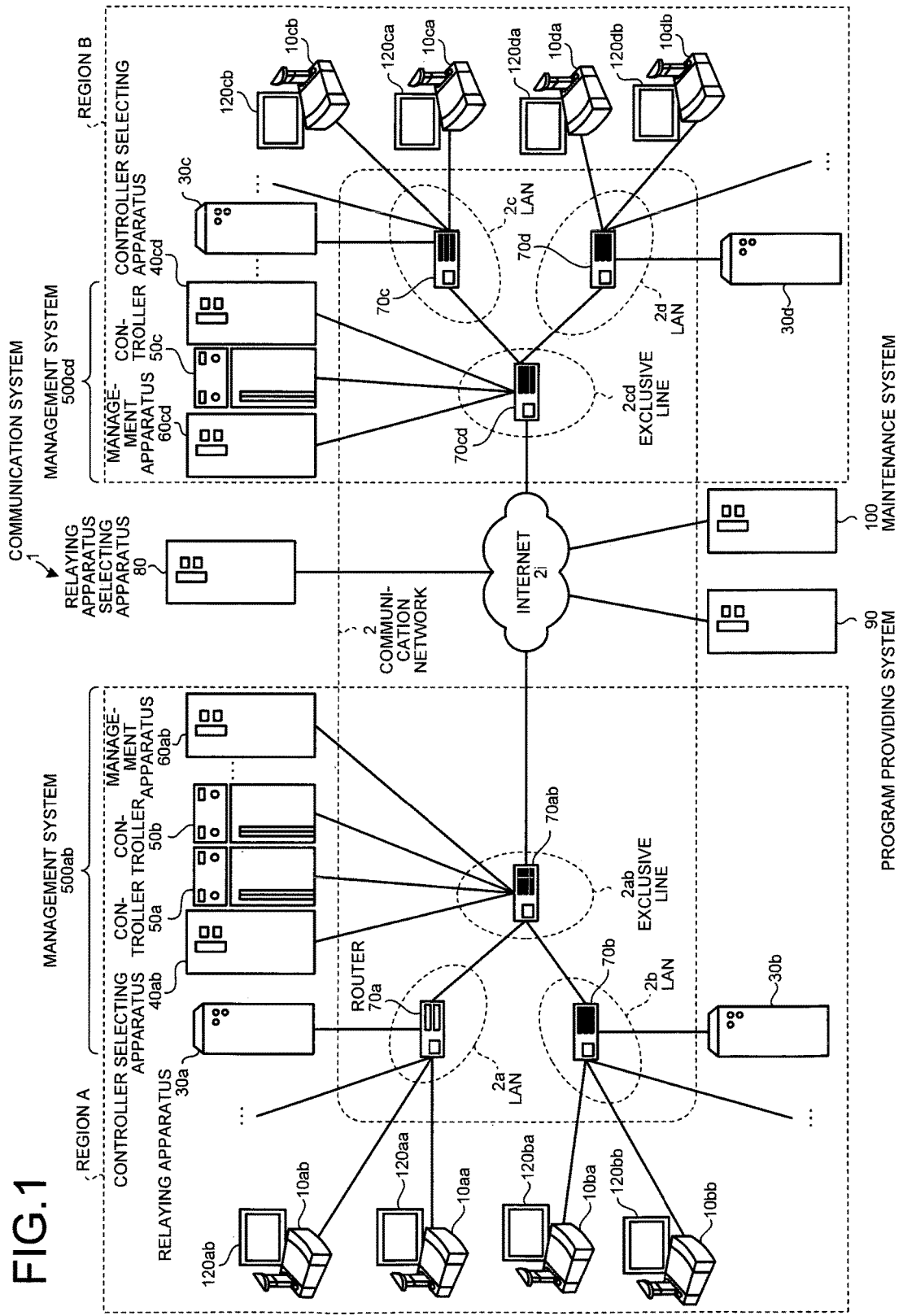
FIG. 1 is a schematic diagram of a communication system according to an embodiment of the present invention.
Figure 2:
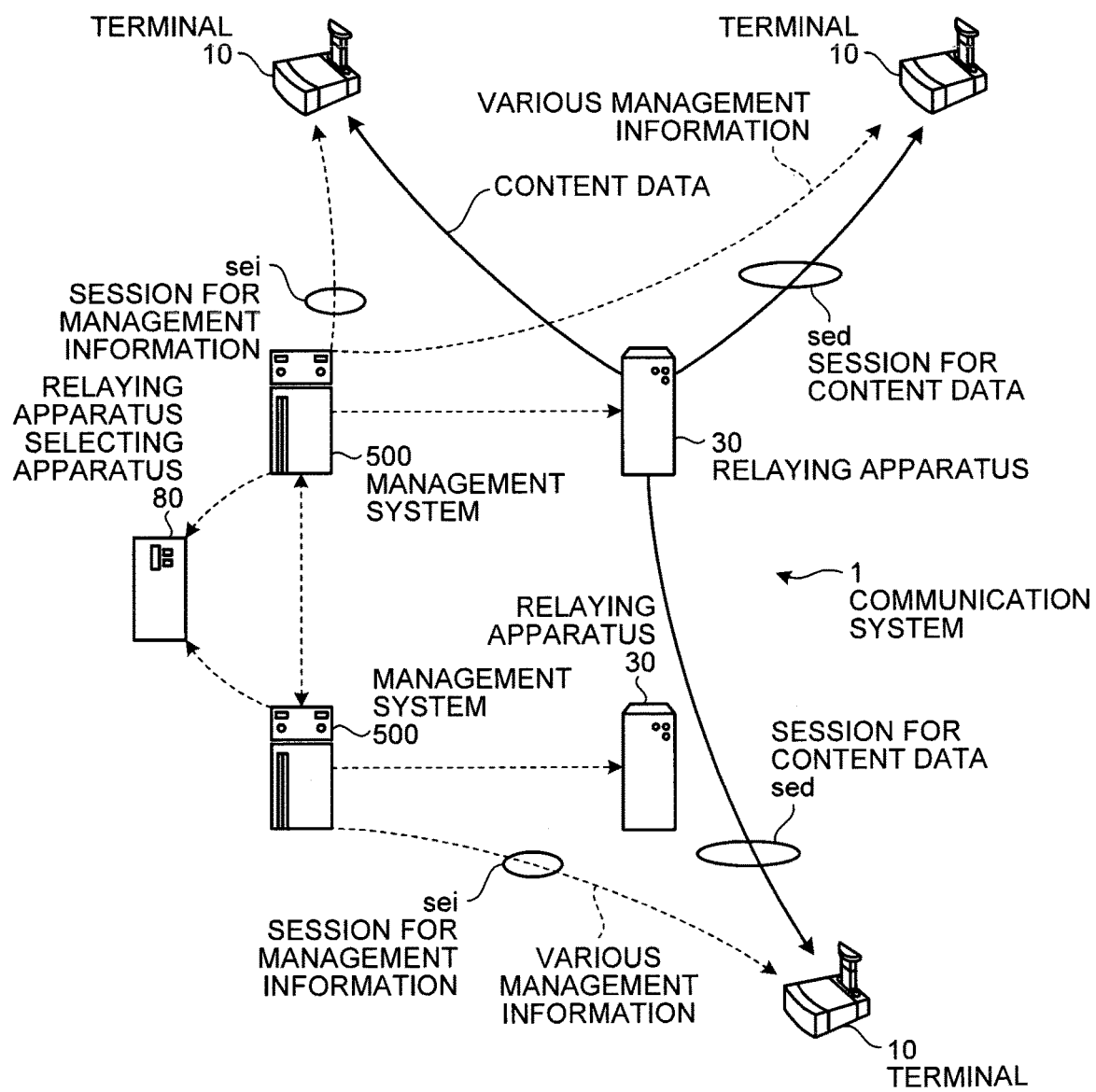
FIG. 2 is a conceptual diagram illustrating the state of the transmission and reception of image data, voice data, and various types of management information in the communication system.

An embodiment according to the present invention will be described below. First, the overall structure of the embodiment will be described with reference to FIG. 1 and FIG. 2. FIG. 1 is a schematic diagram of a communication system according to the embodiment of the present invention. FIG. 2 is a conceptual diagram illustrating the state of the transmission and reception of image data, voice data, and various types of management information in the communication system.

The communication system according to the present embodiment includes a data providing system that communicates content data unidirectionally from one communication terminal to another communication terminal and a communication system that transmits information mutually among a plurality of communication terminals. This communication system is a system for transmitting information mutually among a plurality of communication terminals (corresponding to "communication terminals") via a communication management system (corresponding to a "communication management system"), and examples thereof may include teleconference systems, videophone systems, voice conference systems, voice phone systems, personal computer (PC) screen sharing systems, and data sharing systems.

The present embodiment describes a communication system, a communication management system, and a communication terminal assuming a teleconference system as an example of the communication system, a teleconference management system as an example of the communication management system, and a teleconference terminal as an example of the communication terminal. In other words, the communication terminal and the communication management system according to the present embodiment are not only used in the teleconference system, but also used in the communication system.

This communication system 1 illustrated in FIG. 1 includes a plurality of communication terminals (10aa, 10ab, . . . ), displays (120aa, 120ab, . . . ) for the respective communication terminals (10aa, 10ab, . . . ), a plurality of relaying apparatuses (30a, 30b, 30c, 30d), a plurality of communication management systems (500ab, 500cd), a relaying apparatus selecting apparatus 80, a program providing system 90, and a maintenance system 100. The communication terminals 10 perform communication through the transmission and reception of image data and voice data as examples of content data. The content data is not limited to the image data and the voice data and may be at least one of image data, voice data, and text data, for example. The image of the image data may be a moving image and a still image and may be both a moving image and a still image. The present embodiment describes a case in which the image of the image data is a moving image.

In the following, the "communication terminal" will be simply denoted as a "terminal" and the "communication management system" will be simply denoted as a "management system." Among the communication management systems (500ab, 500cd), any management system will be denoted as a "management system 500." Among the terminals (10aa, 10ab, . . . ), any terminal will be denoted as a "terminal 10." Among the displays (120aa, 120ab, . . . ), any display will be denoted as a "display 120." Among the relaying apparatuses (30a, 30b, 30c, 30d), any relaying apparatus will be denoted as a "relaying apparatus 30."

As illustrated in FIG. 2, in the communication system 1, a session sei for management information is established for transmitting and receiving various types of management information between the terminals 10 via the management system 500. A session is established for transmitting and receiving image data and voice data between the terminals 10 via the relaying apparatus 30. In this example, the session for transmitting and receiving the image data and the voice data is collectively illustrated as a session sed for content data.

The terminal 10 illustrated in FIG. 1 performs the transmission and reception of content data such as image data and voice data in order to perform communication with the other terminal 10. In other words, the communication in the present embodiment includes not only the transmission and reception of the voice data, but also the transmission and reception of the image data. The terminal 10 may perform the transmission and reception of the voice data without performing the transmission and reception of the image data. The relaying apparatus 30 selected out of the relaying apparatuses 30 by the relaying apparatus selecting apparatus 80 relays content data among the terminals 10. The management system 500 may be constructed by a plurality of computers. In the communication system 1 illustrated in FIG. 1, a plurality of controllers (50a, 50b, . . . ), a management apparatus 60ab, and a controller selecting apparatus 40ab construct the communication management system 500ab. In the following, among the controllers (50a, 50b, . . . ), any controller will be denoted as a "controller 50."

A plurality of routers (70a, 70b, 70c, 70d, 70ab, 70cd) selects an optimum path of content data. In the following, among the routers (70a, 70b, 70c, 70d, 70ab, 70cd), any router will be denoted as a "router 70."

The program providing system 90 includes a hard disk (HD) 204 described below, which stores therein a program for terminals to cause the terminal 10 to implement various functions (or to cause the terminal 10 to function as various units) and can transmit the program for terminals to the terminal 10. The HD 204 of the program providing system 90 also stores therein a program for relaying apparatuses to cause the relaying apparatus 30 to implement various functions (or to cause the relaying apparatus 30 to function as various units) and can transmit the program for relaying apparatuses to the relaying apparatus 30. The HD 204 of the program providing system 90 also stores therein a program for a relaying apparatus selecting apparatus to cause the relaying apparatus selecting apparatus 80 to implement various functions (or for the relaying apparatus selecting apparatus 80 to function as various units) and can transmit the program for a relaying apparatus selecting apparatus to the relaying apparatus selecting apparatus 80. The HD 204 of the program providing system 90 also stores therein a program for a maintenance system to cause the maintenance system 100 to implement various functions (or for the maintenance system 100 to function as various units) and can transmit the program for a maintenance system to the maintenance system 100.

The maintenance system 100 is a computer for keeping, managing, or maintaining at least one of the terminal 10, the relaying apparatus 30, the management system 500, the relaying apparatus selecting apparatus 80, and the program providing system 90. When the maintenance system 100 is domestically installed, and the terminal 10, the relaying apparatus 30, the management system 500, the relaying apparatus selecting apparatus 80, and the program providing system 90 are installed abroad, for example, the maintenance system 100 keeps, manages, or maintains at least one of the terminal 10, the relaying apparatus 30, the management system 500, the relaying apparatus selecting apparatus 80, and the program providing system 90 remotely via a communication network 2. The maintenance system 100 performs maintenance such as the management of the model number, serial number, customer, maintenance and inspection, trouble history or the like of at least one of the terminal 10, the relaying apparatus 30, the management system 500, the relaying apparatus selecting apparatus 80, and the program providing system 90 without the involvement of the communication network 2.

The terminals (10*aa*, 10*ab*, ... ), the relaying apparatus 30*a*, and the router 70*a* are communicably connected via a LAN 2*a*. The terminals (10*ba*, 10*bb*, ... ), the relaying apparatus 30*b*, and the router 70*b* are communicably connected via a LAN 2*b*. The management system 500*ab*, the LAN 2*a*, and the LAN 2*b* are communicably connected via an exclusive line 2*ab* including the router 70*ab* and are constructed in a given region A. The region A is Japan, the LAN 2*a* is constructed in a Tokyo office, and the LAN 2*b* is constructed in an Osaka office, for example. The management system 500*ab* manages the state of the terminals (10*aa*, 10*ab*, ... 10*ba*, 10*bb*, ... ) connected to the LAN 2*a* or the LAN 2*b* and controls the connection between the terminals 10 using the relaying apparatuses (30*a*, 30*b*).

The terminals (10*ca*, 10*bb*, ... ), the relaying apparatus 30*c*, and the router 70*c* are communicably connected via a LAN 2*c*. The terminals (10*da*, 10*db*, ... ), the relaying apparatus 30*d*, and the router 70*d* are communicably connected via a LAN 2*d*. The management system 500*cd*, the LAN 2*c*, and the LAN 2*d* are communicably connected via an exclusive line 2*cd* including the router 70*cd* and are constructed in a given region B. The region B is the United States of America, the LAN 2*c* is constructed in a New York office, and the LAN 2*d* is constructed in a Washington D.C. office, for example. The region A and the region B are communicably connected via the Internet 2*i* from the routers (70*ab*, 70*cd*), respectively. The management system 500*cd* manages the state of the terminals (10*ca*, 10*cb*, ... 10*da*, 10*db*, ... ) connected to the LAN 2*c* or the LAN 2*d* and controls the connection among the terminals 10 using the relaying apparatuses (30*c*, 30*d*).

The relaying apparatus selecting apparatus 80, the program providing system 90, and the maintenance system 100 are communicably connected with the terminal 10, the relaying apparatus 30, or the management system 500 via the Internet 2*i*. The relaying apparatus selecting apparatus 80, the program providing system 90, and the maintenance system 100 may be installed in the region A or the region B or may be installed in any region other than these regions.

In the present embodiment, the communication network 2 according to the present embodiment is constructed by the LAN 2*a*, the LAN 2*b*, the exclusive line 2*ab*, the Internet 2*i*, the exclusive line 2*cd*, the LAN 2*c*, and the LAN 2*d*. The communication network 2 may include a part in which, not only wired, but also wireless communication such as Wireless Fidelity (WiFi) and Bluetooth (registered trademark) is performed.

The terminals 10 may be used in, not only communication between a plurality of offices and communication between different rooms in the same office, but also communication within the same room and outdoor-to-indoor or outdoor-to-outdoor communication. When the terminals 10 are used outdoor, wireless communication such as mobile phone communication network is performed.

Hardware Configuration of Embodiment

Figure 3:
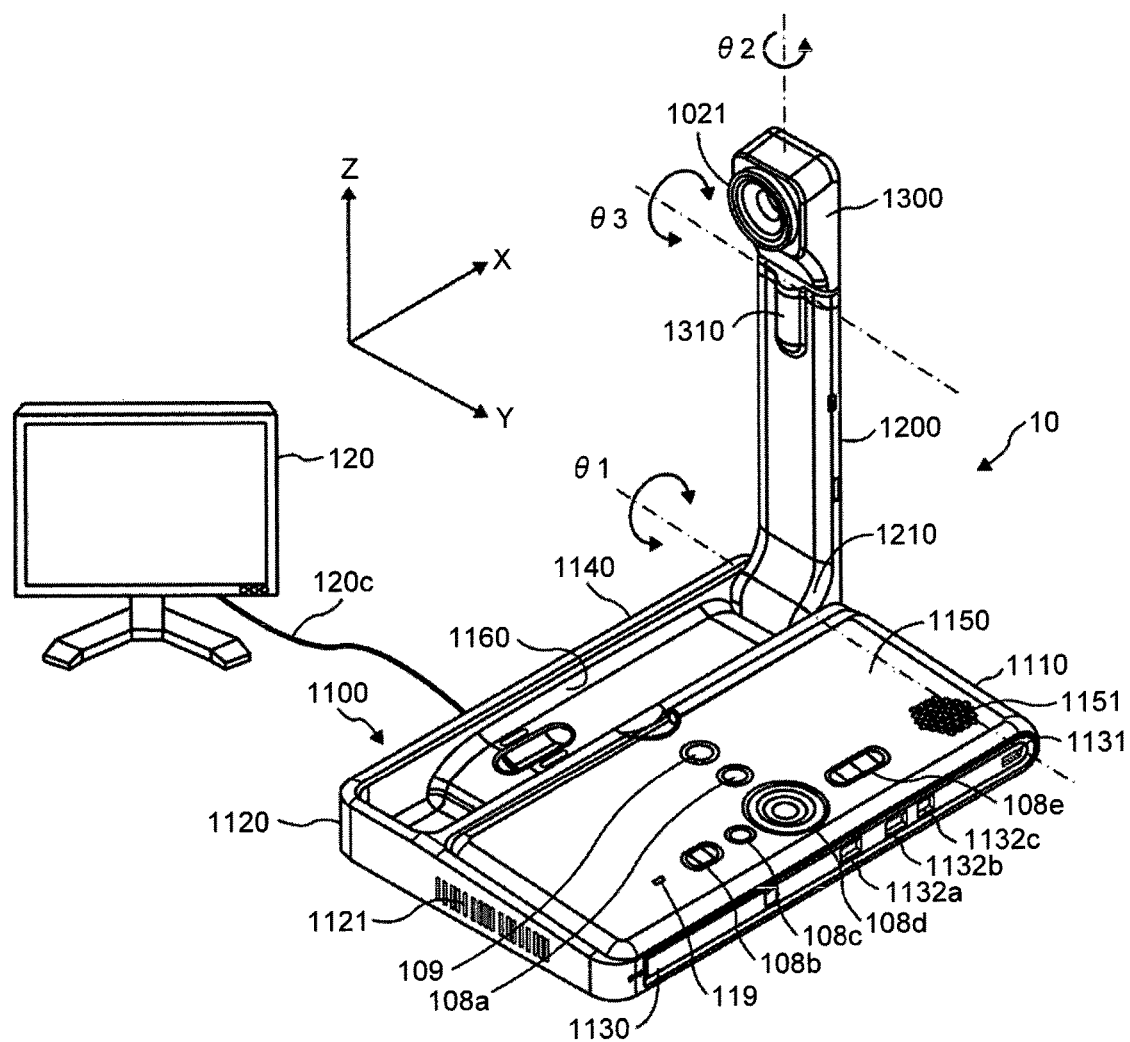
FIG. 3 is an external view of a terminal according to the embodiment of the present invention.
Figure 4:
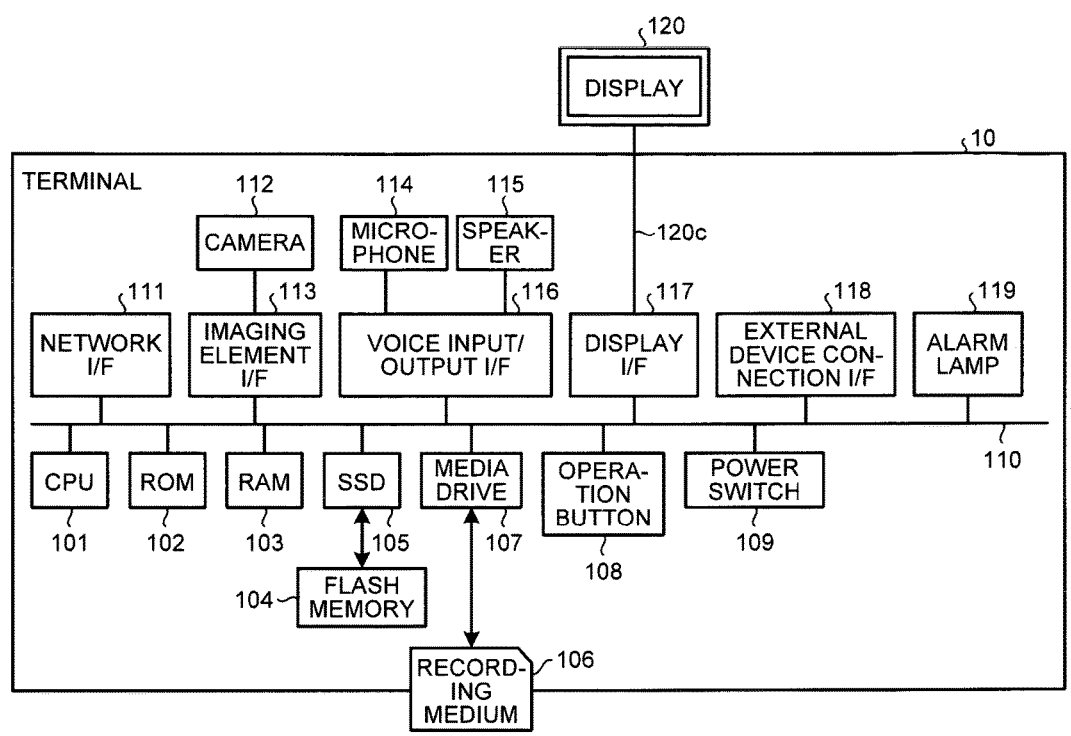
FIG. 4 is a hardware configuration diagram of the terminal according to the embodiment of the present invention.

Next, the hardware configuration of the present embodiment will be described. First, the hardware configuration of the terminal 10 will be described with reference to FIG. 3 and FIG. 4. FIG. 3 is an external view of a terminal according to the embodiment of the present invention. FIG. 4 is a hardware configuration diagram of the terminal according to the embodiment of the present invention. The following will describe with the longitudinal direction of the terminal 10 as an X-axial direction, with the direction orthogonal to the X-axial direction on the horizontal plane as a Y-axial direction, and with the direction (the vertical direction) orthogonal to the X-axial direction and the Y-axial direction as a Z-axial direction.

As illustrated in FIG. 3, the terminal 10 includes a housing 1100, an arm 1200, and a camera housing 1300. An intake plane (not illustrated) formed by a plurality of intake holes is formed on a front wall 1110 of the housing 1100, whereas an exhaust plane 1121 formed by a plurality of exhaust holes is formed on a rear wall 1120 of the housing 1100. This takes in outside air in the rear of the terminal 10 via the intake plane (not illustrated) and exhausts it to the rear of the terminal 10 via the exhaust plane 1121 by the drive of a cooling fan incorporated in the housing 1100. A sound pickup hole 1131 is formed on a right wall 1130 of the housing 1100, and sounds such as voices, sounds, and noises can be picked up by a built-in microphone 114 described below.

An operating panel 1150 is formed on the right wall 1130 of the housing 1100. The operating panel 1150 includes a plurality of operation buttons (108*a* to 108*e*) described below, a power switch 109 described below, an alarm lamp 119 described below, and a sound output plane 1151 formed by a plurality of sound output holes for passing through output sounds from a built-in speaker 115 described below. A housing unit 1160 as a recess for housing the arm 1200 and the camera housing 1300 is formed on a left wall 1140 of the housing 1100. A plurality of connecting ports (1132*a* to 1132*c*) are formed on the right wall 1130 of the housing 1100 for electrically connecting cables to an external device connection I/F 118 described below. A connecting port (not illustrated) is formed on the left wall 1140 of the housing 1100 for electrically connecting a cable 120*c* for the display 120 to the external device connection I/F 118 described below.

In the following description, an "operation button 108" will be used when indicating any operation button among the operation buttons (108*a* to 108*e*), and a "connecting port 1132" will be used when indicating any connecting port among the connecting ports (1132a to 1132c).

The arm 1200 is attached to the housing 1100 via a torque hinge 1210, and the arm 1200 is rotatable in the up and down direction within the range of a tilt angle θ1 of 135 degrees with respect to the housing 1100. FIG. 3 illustrates a state in which the tilt angle θ1 is 90 degrees.

The camera housing 1300 includes a built-in camera 112 described below, which can image users, documents, rooms, or the like. The camera housing 1300 forms a torque hinge 1310. The camera housing 1300 is attached to the arm 1200 via the torque hinge 1310. The camera housing 1300 is attached to the arm 1200 via the torque hinge 1310, and the camera housing 1300 is rotatable with respect to the arm 1200 in the up and down and right and left directions within the range of a pan angle θ2 of ±180 degrees and within the range of a tilt angle θ3 of ±45 degrees with the state illustrated in FIG. 3 as 0 degree.

As illustrated in FIG. 4, the terminal 10 according to the present embodiment includes a central processing unit (CPU) 101 that controls the entire operation of the terminal 10, a read only memory (ROM) 102 that stores, therein the program for terminals, a random access memory (RAM) 103 used as a work area of the CPU 101, a flash memory 104 that stores therein various data such as image data and voice data, a solid state drive (SSD) 105 that controls the reading and writing of the various data from and into the flash memory 104 in accordance with the control of the CPU 101, a media drive 107 that controls the reading and writing (recording) data from and into a recording medium 106 such as a flash memory, the operation button 108 used when selecting a destination of the terminal 10 or the like, the power switch 109 for switching ON/OFF of the power of the terminal 10, and a network interface (I/F) 111 for performing data communication using the communication network 2 described below.

The terminal 10 also includes the built-in camera 112 that images a subject in accordance with the control of the CPU 101 and obtains image data, an imaging element I/F 113 that controls the drive of the camera 112, the built-in microphone 114 that inputs voices, the built-in speaker 115 that outputs voices, an voice input/output I/F 116 that processes the input and output of voice signals between the microphone 114 and the speaker 115 in accordance with the control of the CPU 101, a display I/F 117 that communicates image data to the external display 120 in accordance with the control of the CPU 101, an external device connection I/F 118 for connecting various external devices, the alarm lamp 119 indicating abnormalities of the various functions of the terminal 10, and a bus line 110 such as an address bus and a data bus for electrically connecting the above components as illustrated in FIG. 4.

The display 120 is a display unit including liquid crystals or organic EL displaying images of subjects, operating icons, or the like. The display 120 is connected to the display I/F 117 via the cable 120c. The cable 120c may be an analog RGB (VGA) signal cable, may be a component video cable, and may be a High-Definition Multimedia Interface (HDMI) or Digital Video Interactive (DVI) signal cable.

The camera 112 includes a lens and a solid-state imaging element that converts light into electric charges to digitize an image (video) of a subject, the solid-state imaging element being a complementary metal oxide semiconductor (CMOS), a charge coupled device (CCD), or the like.

External devices such as an external camera, an external microphone, and an external speaker can be electrically connected to the external device connection I/F 118 with a universal serial bus (USB) cable or the like inserted into the connecting port 1132 of the housing 1100 illustrated in FIG. 3. When the external camera is connected, the external camera is driven preferentially to the built-in camera 112 in accordance with the control of the CPU 101. Similarly, when the external microphone is connected, or when the external speaker is connected, the external microphone and the external speaker are driven preferentially to the built-in microphone 114 and the built-in speaker 115, respectively, in accordance with the control of the CPU 101.

The recording medium 106 is attachable and detachable to and from the terminal 10. It is only required to be a nonvolatile memory that reads and writes data in accordance with the control of the CPU 101. Without being limited to the flash memory 104, it may be an electrically erasable and programmable ROM (EEPROM) or the like.

The program for terminals may be recorded in a computer-readable recording medium (the recording medium 106 or the like) as an installable or executable file and distributed. The program for terminals may be stored in the ROM 102 rather than the flash memory 104. The external view and the hardware configuration diagram illustrated in FIG. 3 and FIG. 4 are merely an embodiment and are not limiting. The appearance and hardware may be, for example, a general desktop or notebook personal computer, a smartphone, a tablet type terminal, an electronic blackboard, a projector, and an image forming apparatus such as a multifunction peripheral and a printer. In this case, a camera and a microphone are not necessarily required to be built in and may be externally attached.

Figure 5:
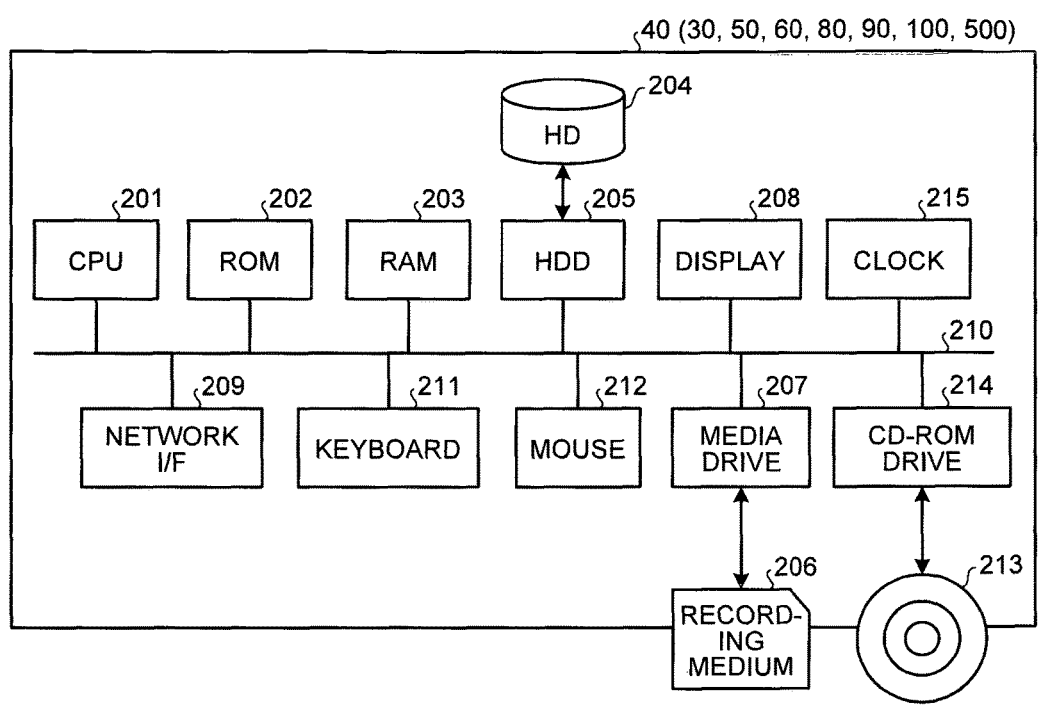
FIG. 5 is a hardware configuration diagram of a management system according to the embodiment of the present invention.

The following describes the hardware configuration of the controller selecting apparatus 40, the controller 50, management apparatus 60, the relaying apparatus 30, the relaying apparatus selecting apparatus 80, the program providing system 90, the maintenance system 100, and the management system 500 with reference to FIG. 5. FIG. 5 is a hardware configuration diagram of a controller according to the embodiment of the present invention. FIG. 5 is a hardware configuration diagram of a controller according to the embodiment of the present invention. The controller selecting apparatus 40, the controller 50, the management apparatus 60, the relaying apparatus 30, the relaying apparatus selecting apparatus 80, the program providing system 90, and the maintenance system 100 have the same appearance as a general server computer, and the description of their appearance is omitted.

The controller selecting apparatus 40 includes: a CPU 201 that controls the entire operation of the controller selecting apparatus 40; a ROM 202 that stores therein a program for use in the drive of the CPU 201 such as an initial program loader (IPL); a RAM 203 used as a work area of the CPU 201; an HD 204 that stores therein various data such as a program for communication management; a hard disk drive (HDD) 205 that controls the reading and writing of the various data from and into the HD 204 in accordance with the control of the CPU 201; a media drive 207 that controls the reading and writing (recording) of data from and into a recording medium 206 such as a flash memory; a display 208 that displays various information such as cursors, menus, windows, characters, and images; a network I/F 209 for performing data communication using the communication network 2; a keyboard 211 having a plurality of keys for inputting characters, numeric values, various instructions, and the like; a mouse 212 that performs the selection and execution of various instructions, the selection of an object to be processed, the movement of a cursor, and the like; a CD-ROM drive 214 that controls the reading and writing of various data from and into a compact disc read only memory (CD-ROM) 213 as an example of a detachable recording medium; a clock 215 as an internal clock of the controller selecting apparatus 40; and a bus line 210 such as an address bus and a data bus for electrically connecting the above components as illustrated in FIG. 5.

The program for controller selecting apparatuses may be recorded in a computer-readable recording medium such as the recording medium 206 and the CD-ROM 213 as an installable or executable file and distributed. The program for controller selecting apparatuses may be stored in the ROM 202 rather than the HD 204.

The relaying apparatus 30, the controller 50, the management apparatus 60, the relaying apparatus selecting apparatus 80, the program providing system 90, the maintenance system 100 have the same hardware configuration as the controller selecting apparatus 40, and the detailed description thereof is omitted. The HD 204 records therein the program for relaying apparatuses, the program for communication control apparatuses, the program for management apparatuses, the program for a relaying apparatus selecting apparatus, a program for program provision, or a program for maintenance for controlling the relaying apparatus 30, a controller 50, a management apparatus 60, the relaying apparatus selecting apparatus 80, the program providing system 90, or the maintenance system 100. Also in this case, the programs may be recorded in a computer-readable recording medium such as the recording medium 206 and the CD-ROM 213 as an installable or executable file and distributed. The programs may be stored in the ROM 202 rather than the HD 204. The programs may be recorded in a computer-readable recording medium such as a compact disc recordable (CD-R) and a digital versatile disc (DVD), which are other examples of the detachable recording medium and provided.

Functional Configuration of Embodiment

Figure 6:
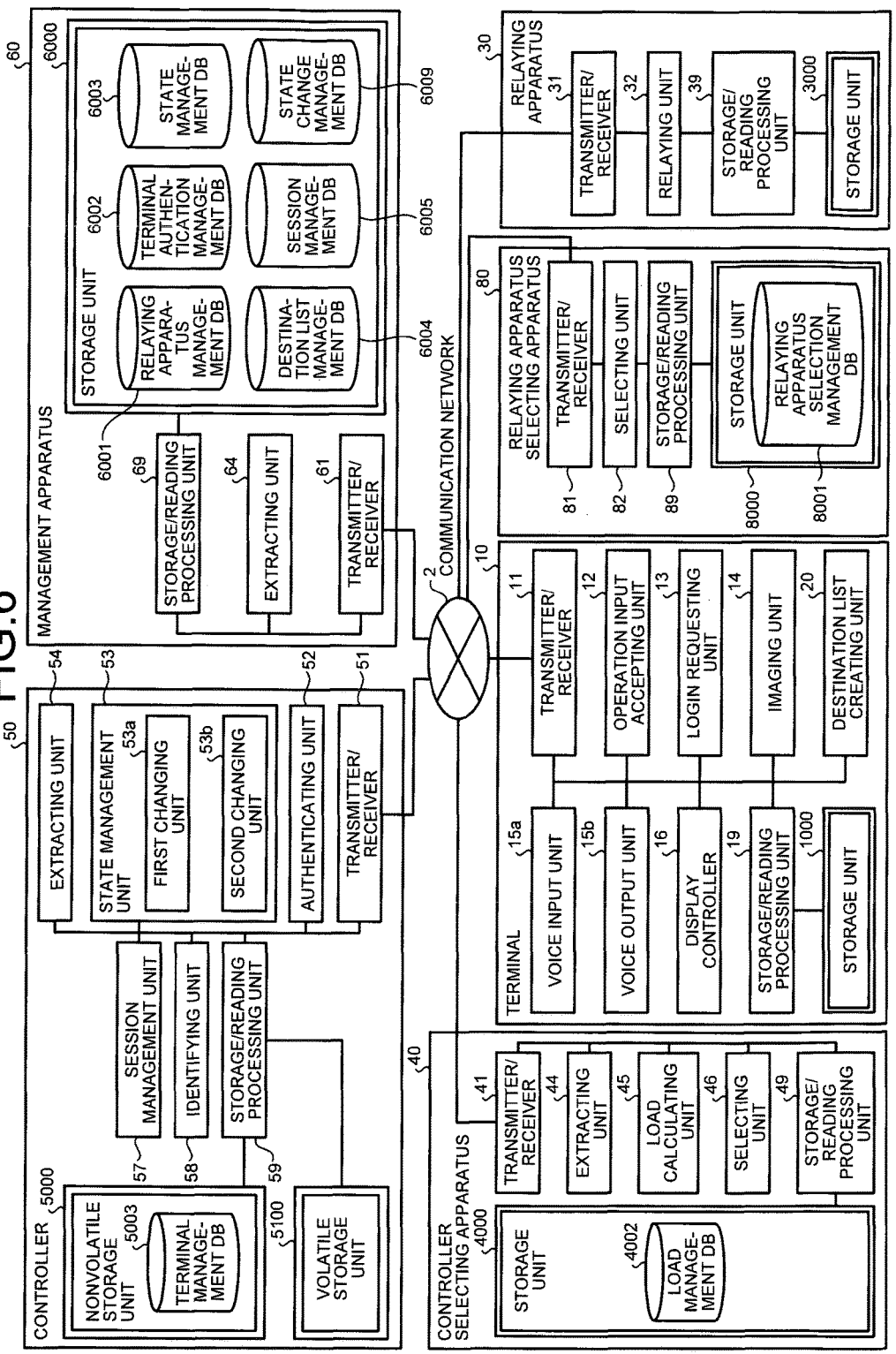
FIG. 6 is a functional block diagram of a terminal, apparatuses, and a system constituting the communication system according to the embodiment.

Next, the functional configuration of the present embodiment will be described with reference to FIG. 6. FIG. 6 is a functional block diagram of a terminal, apparatuses, and a system constituting the communication system according to the embodiment. In FIG. 6, each of the terminal 10, the relaying apparatus 30, the relaying apparatus selecting apparatus 80, and the management system 500 are connected so as to perform data communication via the communication network 2. The program providing system 90 and the maintenance system 100 illustrated in FIG. 1 are omitted in FIG. 6, because they are not directly related to communication in a teleconference.

Functional Configuration of Terminal

Figure 7:
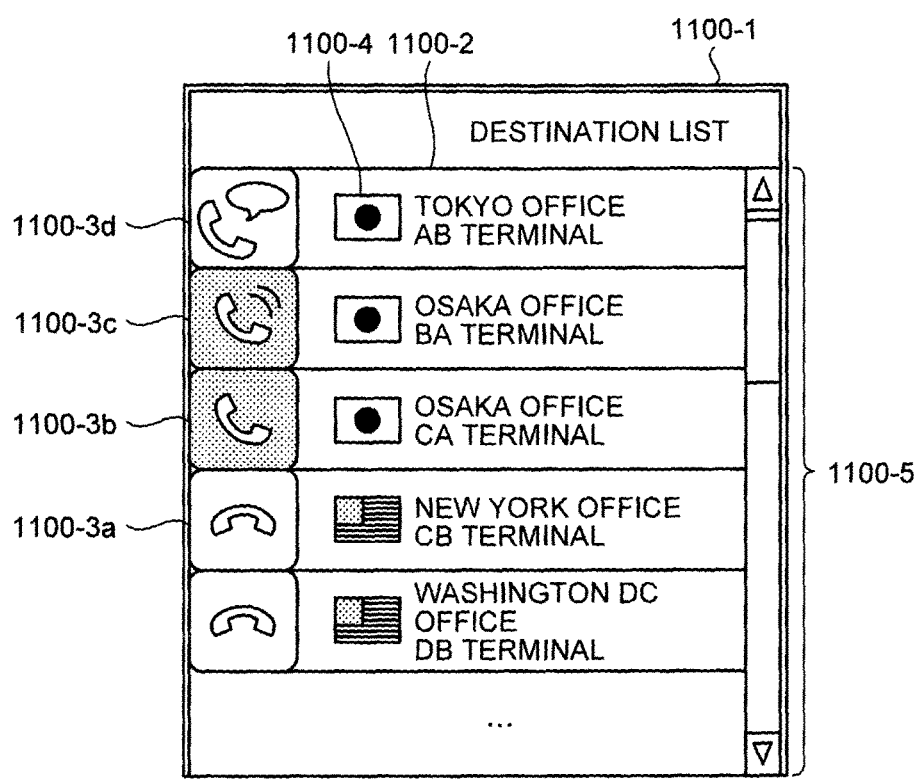
FIG. 7 is a conceptual diagram illustrating a destination list.

The terminal 10 includes a transmitter/receiver 11, an operation input accepting unit 12, a login requesting unit 13, an imaging unit 14, a voice input unit 15*a*, a voice output unit 15*b*, a display controller 16, a storage/reading processing unit 19, and a destination list creating unit 20. These components are functions or means that function implemented by the operation of any of the components illustrated in FIG. 4 by commands from the CPU 101 in accordance with the program for terminals loaded from the flash memory 104 onto the RAM 103. The terminal 10 includes a storage unit 1000 including the RAM 103 illustrated in FIG. 4 and the flash memory 104 illustrated in FIG. 4. The storage unit 1000 stores therein a destination list frame 1100-1 illustrated in FIG. 7. FIG. 7 is a conceptual diagram illustrating a destination list.

Functional Components of Terminal

Next, the functional configurations of the terminal 10 will be described with reference to FIG. 4 and FIG. 6. In describing the functional configurations of the terminal 10, the following will also describe the relation with principal components for achieving the functional configurations of the terminal 10 among the components illustrated in FIG. 4.

The transmitter/receiver 11 is implemented by commands from the CPU 101 illustrated in FIG. 4 and the network I/F 111 illustrated in FIG. 4 and performs the transmission and reception of various data (or information) with the other terminals, apparatuses, or systems via the communication network 2. The transmitter/receiver 11 starts the reception of respective pieces of state information indicating the states of the respective terminals 10 as destination candidates from the management system 500 before starting communication with the other terminal 10. This state information indicates the operation states (being online or offline, whether being in conference when being online, or the like) of the respective terminals 10. The state information indicates not only the operation states of the respective terminal 10, but also various states, in which the cable 120*c* is detached from the terminal 10, images are not output although voices are output, and voices are not output (mute) in the terminal 10. The following will describe a case in which the state information indicates the operation state, as an example.

The operation input accepting unit 12 is implemented by commands from the CPU 101 illustrated in FIG. 4 and the operation button 108 and the power switch 109 illustrated in FIG. 4 and receives various inputs from a user. When the user turns on the power switch 109 illustrated in FIG. 4, the operation input accepting unit 12 illustrated in FIG. 6 receives the power-on and turns on the power.

The login requesting unit 13 is implemented by commands from the CPU 101 illustrated in FIG. 4. With the acceptance of the power-on as a trigger, the login-requesting unit 13 automatically transmits login request information indicating a request for a login from the transmitter/receiver 11 to the management system 500 via the communication network 2. The trigger for transmitting the login request information is not limited to the power-on and may be the acceptance of operation input by the user via the operation input accepting unit 12. When the user turns off the power switch 109 from the power-on state, the transmitter/receiver 11 transmits state information indicating the turning off of the power to the management system 500, and then the operation input accepting unit 12 perfectly turns off the power. This causes the management system 500 to grasp that the terminal 10 has been turned from the power-on to power-off.

The imaging unit 14 is implemented by commands from the CPU 101 illustrated in FIG. 4 and the camera 112 and the imaging element I/F 113 illustrated in FIG. 4, images a subject, and outputs image data obtained by the imaging.

The voice input unit 15*a* is implemented by commands from the CPU 101 illustrated in FIG. 4 and the voice input/output I/F 116 illustrated in FIG. 4, and after a voice of the user is converted into a voice signal by the microphone 114, inputs voice data related to the voice signal. The voice output unit 15*b* is implemented by commands from the CPU 101 illustrated in FIG. 4 and the voice input/output I/F 116 illustrated in FIG. 4, outputs a voice signal related to voice data to the speaker 115, and outputs a voice from the speaker 115.

The display controller 16 is implemented by commands from the CPU 101 illustrated in FIG. 4 and the display I/F 117 illustrated in FIG. 4 and performs control to transmit received image data to the display 120.

The display controller 16 causes the display 120 to display a destination list including destination names based on information received from the management system 500. The display controller 16 displays the destination list frame 1100-1 as illustrated in FIG. 7 on the display 120, for example. The destination list frame 1100-1 displays destination names such as a destination name "Tokyo Office AB terminal" 1100-2, icons (1100-3a, 1100-3b, 1100-3c, 1100-3d) indicating the state of the terminal 10 for each destination name, and an icon 1100-4 indicating a region. The icon 1100-3a indicates that the terminal 10 as one of the destination candidates is in an offline state (hereinafter, this state is called "Offline.") and that it is incommunicable with this terminal. The icon 1100-3b indicates that the terminal 10 as one of the destination candidates is in a standby state before starting communication (hereinafter, this state is called "None.") The icon 1100-3c indicates that the terminal 10 as one of the destination candidates is in a state requesting communication with the other terminal (hereinafter, this state is called "Calling.") or a state being requested from the other terminal 10 (hereinafter, this state is called "Ringing."). The icon 1100-3d indicates a state in which the above request is accepted (hereinafter, this state of the terminal 10 is called "Accepted.") or a state in which the terminal 10 as one of the destination candidates is in communication with the other terminal 10 (hereinafter, this state is called "Busy."). The destination list frame 1100-1 displays a scroll bar 1100-5 on the right, and upward and downward triangle icons are selected, thereby displaying destination names and state of destination candidates not illustrated in FIG. 7.

The storage/reading processing unit 19 is implemented by commands from the CPU 101 illustrated in FIG. 4 and the SSD 105 illustrated in FIG. 4 or implemented by commands from the CPU 101 and performs storing various data in the storage unit 1000 and reading the various data stored in the storage unit 1000. The storage unit 1000 stores therein terminal identifications (IDs) for identifying the terminal 10, passwords, and the like. The storage unit 1000 stores therein image data and voice data received each time communication with a destination terminal is performed in an overwriting manner for each reception. An image is displayed on the display 120 based on image date before being overwritten, and a voice is output from the speaker 115 based on voice data before being overwritten. The IDs such as the terminal IDs in the present embodiment indicate identification such as languages, characters, symbols, and various kinds of marks used for uniquely identifying the terminal 10, the user of the terminal 10, or the like. The IDs may be identification obtained by combining at least two of the languages, characters, symbols, and various kinds of marks.

The destination list creating unit 20 creates and updates a destination list indicating the states of the terminals 10 as destination candidates with icons as illustrated in FIG. 7 based on information received from the management system 500.

Functional Configuration of Relaying Apparatus

The relaying apparatus 30 includes a transmitter/receiver 31, a relaying unit 32, and a storage/reading processing unit 39. These components are functions or means that function implemented by the operation of any of the components illustrated in FIG. 5 by commands from the CPU 201 in accordance with the program for relaying apparatuses loaded from the HD 204 onto the RAM 203. The relaying apparatus 30 includes a storage unit 3000 including the RAM 203 illustrated in FIG. 5 or the HD 204 illustrated in FIG. 5.

Functional Components of Relaying Apparatus

Next, the functional components of the relaying apparatus 30 will be described in detail. In describing the functional configurations of the relaying apparatus 30, the following will also describe the relation with principal components for achieving the functional configurations of the relaying apparatus 30 among the components illustrated in FIG. 5.

The transmitter/receiver 31 of the relaying apparatus 30 illustrated in FIG. 6 is implemented by commands from the CPU 201 illustrated in FIG. 5 and the network I/F 209 illustrated in FIG. 5 and performs the transmission and reception of various data (or information) with the other terminals, apparatuses, or systems via the communication network 2. The relaying unit 32 is implemented by commands from the CPU 201 illustrated in FIG. 5 and relays content data transmitted and received among the terminals 10 in the session sed for content data via the transmitter/receiver 31. The storage/reading processing unit 39 is implemented by commands from the CPU 201 illustrated in FIG. 5 and the HDD 205 illustrated in FIG. 5 and performs storing various data in the storage unit 3000 and reading the various data stored in the storage unit 3000.

Functional Configuration of Controller Selecting Apparatus

The controller selecting apparatus 40 includes a transmitter/receiver 41, an extracting unit 44, a load calculating unit 45, a selecting unit 46, and a storage/reading processing unit 49. These components are functions or units that are implemented by the operation of any of the components illustrated in FIG. 5 by commands from the CPU 201 in accordance with the program for controller selecting apparatuses loaded from the HD 204 onto the RAM 203. The controller selecting apparatus 40 includes a storage unit 4000 including the HD 204 illustrated in FIG. 5.

Load Management Table

The storage unit 4000 includes a load management DB 4002 including a load management table as illustrated in FIG. 9. FIG. 9 is a conceptual diagram illustrating a load management table. The load management table manages state information indicating the state of communication of the terminal 10 and load information indicating the degree of load related to the control of the session sed for content data to be performed in the corresponding state in association with each other. The load management table illustrated in FIG. 9 indicates that the load information indicating the degree of load related to the control to be performed when there is no communication with another terminal 10 (i.e., in the case of the state information "None") is "1." In the present embodiment, a larger value of the load information indicates a larger load. The value of the load information indicates the relative magnitude of a load. For example, the load management table in FIG. 9 indicates that the degree of load in the state information "Inviting" is double the degree of load in the state information "None." The degree of load is information for determining the magnitude of a load and may also be information indicating levels or steps of a load, not numeral values. The degree of load may also be a combination of a plurality of pieces of information.

The load information managed in the load management table is set in consideration of a load generated in the controller 50 and a load generated in the surroundings of the controller 50 such as a communication network. According to an embodiment, in order to appropriately connect the communication terminals 10, processing executable by the controller 50 is specified in accordance with the state of communication of the terminal 10. For example, when the state of communication of the terminal 10 is "None," the controller 50 accepts a communication start request from the terminal 10 and causes the relaying apparatus selecting apparatus 80 to select the relaying apparatus 30 that relays content data in the session sed for content data. When the state of communication of the terminal 10 is "Inviting," the controller 50 causes the management apparatus 60 to manage session information, acquires relaying apparatus connection information from the management apparatus 60, and transmits the start request information to the terminal 10 as a start request destination. When the state of communication of the terminal 10 is "Busy," the controller 50 connects the terminal 10 and the relaying apparatus 30.

Examples of a method for setting load information managed in the load management table include, but not limited to, a method that measures loads related to processing executed in each of the states of the terminal 10 by a known method. In this case, for each of the states of the terminal 10, the load generated in the controller 50 and the load generated in the surroundings of the controller 50 such as a communication network by the control in the state are measured in advance. Based on measured values of the loads and the magnitude of the loads per unit time obtained thereby or the like, the load information in each of the states is set. The details of the control performed for each of the states, the method for setting the load information, and the values of the load information in the load management table in FIG. 9 are described by way of example, and appropriate ones may be used in accordance with communication protocols, system configurations, network environments, or the like.

Functional Configurations of Controller Selecting Apparatus

Next, the functional configurations of the controller selecting apparatus 40 will be described in detail. In describing the functional configurations of the controller selecting apparatus 40, the following will also describe the relation with principal components for implementing the functional configurations of the controller selecting apparatus 40 among the components illustrated in FIG. 5.

The transmitter/receiver 41 is implemented by commands from the CPU 201 illustrated in FIG. 5 and the network I/F 209 illustrated in FIG. 5 and performs the transmission and reception of various data or information with the other apparatuses or systems via the communication network 2.

The extracting unit 44 is implemented by commands from the CPU 201 illustrated in FIG. 5, searches the respective management tables of the storage unit 4000, and extracts various types of information.

The load calculating unit 45 calculates, for each of the controllers 50, the degree of load of the controller 50 based on state information managed in a state management table (refer to FIG. 8) and load information managed for each of the states of the terminal 10 in the load management table (refer to FIG. 9).

The selecting unit 46 selects the controller 50 to be connected to the terminal 10 as a login requester terminal based on the degree of the load calculated for each of the controllers 50 by the load calculating unit 45.

The storage/reading processing unit 49 is implemented by commands from the CPU 201 illustrated in FIG. 5 and the HDD 205 illustrated in FIG. 5 and performs to storing various data in the storage unit 4000 and reading the various data stored in the storage unit 4000.

Functional Configuration of Management Apparatus

The management apparatus 60 includes a transmitter/receiver 61, an extracting unit 64, and a storage/reading processing unit 69. These components are functions or means that function implemented by the operation of any of the components illustrated in FIG. 5 by commands from the CPU 201 in accordance with the program for a management system loaded from the HD 204 onto the RAM 203. The management apparatus 60 includes a storage unit 6000 including the HD 204 illustrated in FIG. 5.

Relaying Apparatus Management Table

The storage unit 6000 includes a relaying apparatus management DB 6001 including a relaying apparatus management table as illustrated in FIGS. 10A and 10B. FIG. 10A is a conceptual diagram illustrating a relaying apparatus management table managed by the management apparatus 60*ab*, whereas FIG. 10B is a conceptual diagram illustrating a relaying apparatus management table managed by the management apparatus 60*cd*. The relaying apparatus management table manages relaying apparatus IDs of the respective relaying apparatuses 30 for which the control of connection can be performed by the management system 500 to which the corresponding management apparatus 60 belongs and passwords for connecting to the respective relaying apparatuses 30 in association with each other. The relaying apparatus management table illustrated in FIG. 10A, for example, indicates that the password for connecting to the relaying apparatus 30*a* identified by the relaying apparatus ID "111a@jp.oo.com" is "xxxx." In the present embodiment, the relaying apparatus ID includes domain information (communication control information) such as "jp.oo.com" indicating the management system 500 that can perform control related to the start and end of communication using the relaying apparatus 30 identified thereby. When indicating the relaying apparatus ID in the following description, it will be simply denoted as "111a" or the like with the domain information such as "jp.oo.com" omitted, unless particularly specified. The following describes a case of using the relaying apparatus ID as information used for connecting to the relaying apparatus as an embodiment according to the present invention. However, any information used in the control of connection to the relaying apparatus 30 in the controller 50 is used as the information for connecting to the relaying apparatus without being limited to the relaying apparatus ID.

Terminal Authentication Management Table

The storage unit 6000 further includes a terminal authentication management DB 6002 including a terminal authentication management table as illustrated in FIGS. 11A and 11B. FIG. 11A is a conceptual diagram illustrating a terminal authentication management table managed by the management apparatus 60*ab*, whereas FIG. 11B is a conceptual diagram illustrating a terminal authentication management table managed by the management apparatus 60*cd*. The terminal authentication management table manages respective terminal IDs of all terminals 10 connected to the management system 500 to which the corresponding management apparatus 60 belongs and respective passwords in association with each other. The terminal authentication management table illustrated in FIG. 11A, for example, indicates that the terminal ID of a terminal 10*aa* is "01aa" and that the password is "aaaa."

State Management Table

The storage unit 6000 includes a state management DB 6003 including the state management table as illustrated in FIG. 8. FIG. 8 is a conceptual diagram illustrating a state management table. The state management table manages the terminal IDs of the respective terminals 10 connected to the respective controllers 50 in the management system 500*ab* and state information indicating the state of communication of the terminals 10 in association with each other. In the present embodiment, the terminal ID for identifying the terminal 10 after being connected to the controller 50 includes domain information (terminal connection information) such as "jp1 (jp2).oo.com" indicating the controller 50a (50b) to which the terminal 10 identified thereby connects. This configuration enables the state management table to manage the state of the terminal 10, for each of the controllers 50, connected to the controller 50. When indicating the terminal ID in the following description, it will be simply denoted as "01aa" or the like with the domain information such as "jp1.oo.com" omitted, unless particularly specified. The terminal ID indicated in this example is merely an example of information for use in authentication, and this table is only required to include at least identification for identifying the terminal 10 or the user of the terminal 10 and information for identifying the controller 50 to which the terminal 10 connects and is not limited to this form.

The pieces of state information managed in the state management table are described. The state information "None" indicates a standby state before starting communication. The state information "Inviting" indicates a state in which the terminal 10 is requesting communication with the other terminal. The state information "Invited" indicates a state in which communication is being requested by the other terminal 10.

The state information "Ringing" indicates a state in which the terminal 10 is outputting a dial tone. The state information "Calling" indicates a state in which the terminal 10 is outputting a ring tone. The information "Accepted" indicates a state in which a request for communication is permitted. The information "Busy" indicates a state in which the terminal 10 is in communication with the other terminal 10.

Destination List Management Table

The storage unit 6000 includes a destination list management DB 6004 including a destination list management table as illustrated in FIGS. 12A and 12B. FIG. 12A is a conceptual diagram illustrating a destination list management table managed by the management apparatus 60ab, whereas FIG. 12B is a conceptual diagram illustrating a destination list management table managed by the management apparatus 60cd. The destination list management table manages the terminal ID of the terminal 10 connected to the management system 500 to which the management apparatus 60 concerned belongs and as a requester terminal of the start of communication and all terminal IDs of the terminals 10 registered as communicable destination candidates in association with each other. The destination list management table illustrated in FIG. 12A, for example, indicates that destination candidates the terminal 10aa with the terminal ID "01aa" as the requester terminal can request the start of communication in a teleconference are the terminal 10ab with the terminal ID "01ab" and the like. The destination list management table also manages the terminal ID of the terminal 10 connected to the other management system 500 as the terminal ID of the terminal 10 as a destination candidate. This enables, for example, the terminal 10aa connected to the management system 500ab to select the terminal 10db connected to the management system 500cd as a destination. The destination candidates are updated by addition or deletion through requests for addition or deletion from any terminal 10 to the management system 500.

Session Management Table

The storage unit 6000 includes a session management DB 6005 including a session management table as illustrated in FIGS. 13A and 13B. FIG. 13A is a conceptual diagram illustrating a session management table managed by the management system 500ab, whereas FIG. 13B is a conceptual diagram illustrating a session management table managed by the management apparatus 60cd. The session management table manages session IDs for identifying the session sed for content data between terminals 10, relaying apparatus IDs for identifying the relaying apparatus 30 for relaying the content data in the session sed for content data, and terminal IDs for identifying the terminals 10 that are performing communication in the session sed for data content in association with each other. The session ID may be identification such as conference ID, communication ID, and call ID identifying events such as a conference, communication, a call corresponding to the session sed for content data. The session management table illustrated in FIG. 13A, for example, indicates that the relaying apparatus 30a with the relaying apparatus ID "111a" is relaying content data between terminals (10aa, 10bd) in the session sed for content data identified by the session ID "se01@jp.oo.com." In the present embodiment, the session ID includes domain information (communication control information) such as "jp.oo.com" indicating the management system 500 that can perform control related to the start and end of communication with a session sed for content data identified thereby. When indicating the session ID in the following description, it will be simply denoted as "se01" or the like with the domain information such as "jp.oo.com" omitted, unless particularly specified.

State Change Management Table

The storage unit 6000 includes a state change management DB 6009 including a state change management table as illustrated in FIGS. 14A and 14B. FIGS. 14A and 14B are conceptual diagrams illustrating the state change management table. The state change management table illustrated in FIG. 14A manages pieces of management information transmitted from the terminal 10, pieces of pre-change state information indicating pre-change states of the terminal 10, and pieces post-change state information indicating post-change states of the terminal 10 in association with each other. The management information "Call" in the state change management table in FIG. 14A indicates that, when the session sed for content data is established between the terminals 10, the other terminal 10 requests to participate in this session. The management information "Join" indicates that the terminal 10 requests to start relaying content data. The management information "Leave" indicates that the terminal 10 requests to end communication.

When not only the state of the terminal 10 as the transmission source, but also the state of the terminal 10 as the transmission destination is changed by performing control based on the management information, the state change management table in FIG. 14B is used. The state change management table in FIG. 14B manages, in addition to the pieces of information in FIG. 14A, terminal information indicating whether the terminal 10 whose state is changed is the transmission source or the transmission destination of the management information in association with each other. It is indicated, for example, that when the management system 500 receives the management information "Invite," the state of communication is changed from "None" into "Inviting" for the terminal 10 as the transmission source of the management information, whereas the state of communication is changed from "None" into "Invited" for the terminal 10 as the transmission destination. The management information "Invite" indicates that the terminal 10 requests the start of communication. The management information "Ring" indicates that the terminal 10 accepts a request to start communication and sounds a dial tone. The management information "Accept" indicates that the terminal 10 permits the start of communication. The state information "Inviting" indicates a state requesting the start of communication, whereas the state information "Invited" indicates a state in which the start of communication is being requested.

Functional Configurations of Management Apparatus

Next, the functional configurations of the management apparatus 60 will be described. In describing the functional configurations of the management apparatus 60, the following will also describe the relation with principal components for achieving the functional configurations of the management apparatus 60 among the components illustrated in FIG. 5.

The transmitter/receiver 61 is implemented by commands from the CPU 201 illustrated in FIG. 5 and the network I/F 209 illustrated in FIG. 5 and performs the transmission and reception of various data (or information) with other apparatuses or systems via the communication network 2.

The extracting unit 64 is implemented by commands from the CPU 201 illustrated in FIG. 5, searches the respective management tables of the storage unit 6000, and extracts various types of information.

The storage/reading processing unit 69 is implemented by commands from the CPU 201 illustrated in FIG. 5 and the HDD 205 illustrated in FIG. 5 and performs to storing various types of data in the storage unit 6000 and reading the various types of data stored in the storage unit 6000.

Functional Configuration of Controller

The controller 50 includes a transmitter/receiver 51, an authenticating unit 52, a state management unit 53, an extracting unit 54, a session management unit 57, an identifying unit 58, and a storage/reading processing unit 59. These components are functions or means that function implemented by the operation of any of the components illustrated in FIG. 5 by commands from the CPU 201 in accordance with the program for a management system loaded from the HD 204 onto the RAM 203. The management system 500 includes a nonvolatile storage unit 5000 and a volatile storage unit 5100 including the HD 204 illustrated in FIG. 5.

Terminal Management Table

The nonvolatile storage unit 5000 includes a terminal management DB 5003 including a terminal management table as illustrated in FIG. 16. FIG. 16 is a conceptual diagram illustrating a terminal management table. The terminal management table manages the terminal IDs of the respective terminals 10, destination names with the respective terminals 10 as destinations, and the operation states of the respective terminals 10 in association with each other. In the present embodiment, the operation states include the state of the connection between the terminal 10 and the controller 50 (online, online (in conference), and offline). "Online" among the operation states is a state in which the terminal 10 and the controller 50 are connected, and communication with the other terminal 10 is capable. "Online (in conference)" among the operation states is a state in which the terminal 10 and the controller 50 are connected, and communication with the other terminal 10 is in progress. "Offline" among the operation states is a state in which the terminal 10 and the controller 50 are not connected, and communication with the other terminal 10 is incapable. The terminal management table illustrated in FIG. 16, for example, indicates that the destination name of the terminal 10*aa* with the terminal ID "01aa" is "Tokyo Office AA terminal" and the operation state thereof is "offline."

Functional Configurations of Controller

Next, the functional configurations of the controller 50 will be described in detail. In describing the functional configurations of the controller 50, the following will also describe the relation with principal components for achieving the functional configurations of the controller 50 among the components illustrated in FIG. 5.

The transmitter/receiver 51 is implemented by commands from the CPU 201 illustrated in FIG. 5 and the network I/F 209 illustrated in FIG. 5 and performs the transmission and reception of various types of data (or information) with the other terminals, apparatuses, or systems via the communication network 2. This causes the transmitter/receiver 51 to receive start request information from the terminal 10, thereby accepting a request for the start of communication. Relaying apparatus connection information for connecting to the relaying apparatus 30 is transmitted to the terminal 10, thereby performing control related to the start of communication. The transmitter/receiver 51 transmits participation notification (start information) including the terminal ID and the session ID of the terminal 10 participating in the session sed for content data to the terminal 10 that is performing communication in this session. The transmitter/receiver 51 receives or transmits post-change state information indicating the post-change state of the terminal 10.

The authenticating unit 52 is implemented by commands from the CPU 201 illustrated in FIG. 5 and performs terminal authentication by searching the terminal authentication management table (refer to FIG. 11) of the storage unit 6000 with the terminal ID and the password included in the login request information received via the transmitter/receiver 51 as search keys and determining whether the same terminal ID and password are managed in the terminal authentication management table.

The state management unit 53 is implemented by commands from the CPU 201 illustrated in FIG. 5. To manage the operation state of a requester terminal that requested a login, the state management unit 53 stores and manages the terminal ID of the requester terminals, pieces of state information indicating the operation states of the requester terminals, and the IP addresses of the requester terminals in association with each other in the terminal management table (refer to FIG. 16). A first changing unit 53*a* of the state management unit 53 changes the state information managed in the terminal management table when the operation state of the terminal 10 is changed based on the control by the corresponding controller 50. A second changing unit 53*b* of the state management unit 53 changes the operation state managed in the terminal management table based on post-change state information transmitted from the other controller 50 when the operation state of the terminal 10 is changed based on control by the other controller 50.

The extracting unit 54 is implemented by commands from the CPU 201 illustrated in FIG. 5 and extracts the terminal ID by searching the destination list management table (refer to FIG. 12) with the terminal ID of the requester terminal that requested a login as a key and reading the terminal ID of the terminal 10 as a destination candidate. The extracting unit 54 searches a destination management table with the terminal ID of the requester terminal that requested a login as a key and also extracts the terminal ID of the other requester terminal that registers the terminal ID of the above requester terminal as a candidate for the destination terminal.

The extracting unit 54 is implemented by commands from the CPU 201 illustrated in FIG. 5, searches the terminal management table (refer to FIG. 16) with the terminal ID of the candidate for the destination terminal as a search key, and reads the operation states of the respective terminal IDs. This enables the extracting unit 54 to extract the operation state of the candidate for the destination terminal that can communicate with the requester terminal that requested a login. The extracting unit 54 searches the terminal management table with the terminal ID as a search key and also acquires the operation state of the requester terminal that requested a login.

The session management unit 57 is implemented by commands from the CPU 201 illustrated in FIG. 5, and each time the session sed for content data between the terminals 10 is newly established, generates session ID for identifying the session sed for content data. The session management unit 57 stores in the session management table (refer to FIGS. 13A and 13B) the terminal ID for identifying the terminal 10 that performs communication in this session and the relaying apparatus ID of the relaying apparatus 30 used in this session in association with each other.

The identifying unit 58 is implemented by commands from the CPU 201 illustrated in FIG. 5 and identifies the other controller 50 being in operation arranged in the same segment.

The storage/reading processing unit 59 is implemented by commands from the CPU 201 illustrated in FIG. 5 and the HDD 205 illustrated in FIG. 5 and performs storing various types of data in the nonvolatile storage unit 5000 or the volatile storage unit 5100 and reading the various types of data stored in the nonvolatile storage unit 5000 or the volatile storage unit 5100.

Functional Configuration of Relaying Apparatus Selecting Apparatus

The relaying apparatus selecting apparatus 80 includes a transmitter/receiver 81, a selecting unit 82, and a storage/reading processing unit 89. These components are functions or units that are implemented by the operation of any of the components illustrated in FIG. 5 by commands from the CPU 201 in accordance with the program for a management system loaded from the HD 204 onto the RAM 203. The relaying apparatus selecting apparatus 80 includes a storage unit 8000 including the HD 204 illustrated in FIG. 5.

Relaying Apparatus Selection Management Table

The storage unit 8000 includes a relaying apparatus selection management DB 8001 as an example of a communication control information management unit including a relaying apparatus selection management table as illustrated in FIG. 15. FIG. 15 is a conceptual diagram illustrating the relaying apparatus selection management table. When selecting a relaying apparatus for use in relaying information transmitted and received between the terminals 10, the relaying apparatus selection management table manages, for all relaying apparatuses 30 as candidates for selection, relaying apparatus IDs for identifying the relaying apparatuses 30. The relaying apparatus ID managed in the relaying apparatus selection management table includes domain information (communication control information) such as "jp.oo.com" indicating the management system 500 that can perform control related to the start of communication using the relaying apparatus 30 identified thereby. The relaying apparatus selection management table manages priority information indicating priority when selecting the relaying apparatus 30 identified by the relaying apparatus ID for the respective terminal IDs. The relaying apparatus selection management table illustrated in FIG. 15 indicates that when the terminal 10aa identified by the terminal ID "01aa" starts communication, the priority when selecting the relaying apparatus 30a identified by the relaying apparatus ID "111a" is "3." The priority in the relaying apparatus selection management table is set so that a higher priority gives a higher value based on a bandwidth between the terminal 10 and the relaying apparatus 30 or a delay time when information is transmitted and received between the terminal 10 and the relaying apparatus 30, for example. The priority may be calculated based on time zones used by the terminal 10 and the management system 500. In this case, the value of the priority can be set higher as the time zone used by the terminal 10 and the time zone used by the management system 500 become close to each other, for example.

Functional Configurations of Relaying Apparatus Selecting Apparatus

Next, the functional configurations of the relaying apparatus selecting apparatus 80 will be described in detail. In describing the functional configurations of the relaying apparatus selecting apparatus 80, the following will also describe the relation with principal components for achieving the functional configurations of the relaying apparatus selecting apparatus 80 among the components illustrated in FIG. 5.

The transmitter/receiver 81, which is an example of a selection request information accepting unit and an output unit, is implemented by commands from the CPU 201 illustrated in FIG. 5 and the network I/F 209 illustrated in FIG. 5 and performs the transmission and reception of various types of data (or information) with the other terminals, apparatuses, or systems via the communication network 2. This causes the transmitter/receiver 81 to receive (accept) selection request information indicating a request to select the relaying apparatus 30 transmitted from the management system 500. The transmitter/receiver 81 transmits (outputs) the relaying apparatus ID identifying the relaying apparatus 30 selected by the relaying apparatus selecting apparatus 80 to the management system 500.

The selecting unit 82 is an example of a relaying apparatus selection unit and a communication control information extracting unit and selects at least one relaying apparatus 30 out of a plurality of relaying apparatuses 30 as candidates based on the priority information managed in the relaying apparatus selection management table (refer to FIG. 15). The selecting unit 82 selects the relaying apparatus ID managed in the relaying apparatus selection management table, thereby also extracting the domain information included in the relaying apparatus ID.

The storage/reading processing unit 89 is implemented by commands from the CPU 201 illustrated in FIG. 5 and the HDD 205 illustrated in FIG. 5 and performs storing various types of data in the storage unit 8000 and reading the various types of data stored in the storage unit 8000.

Processing and Operation of Embodiment

Figure 17:
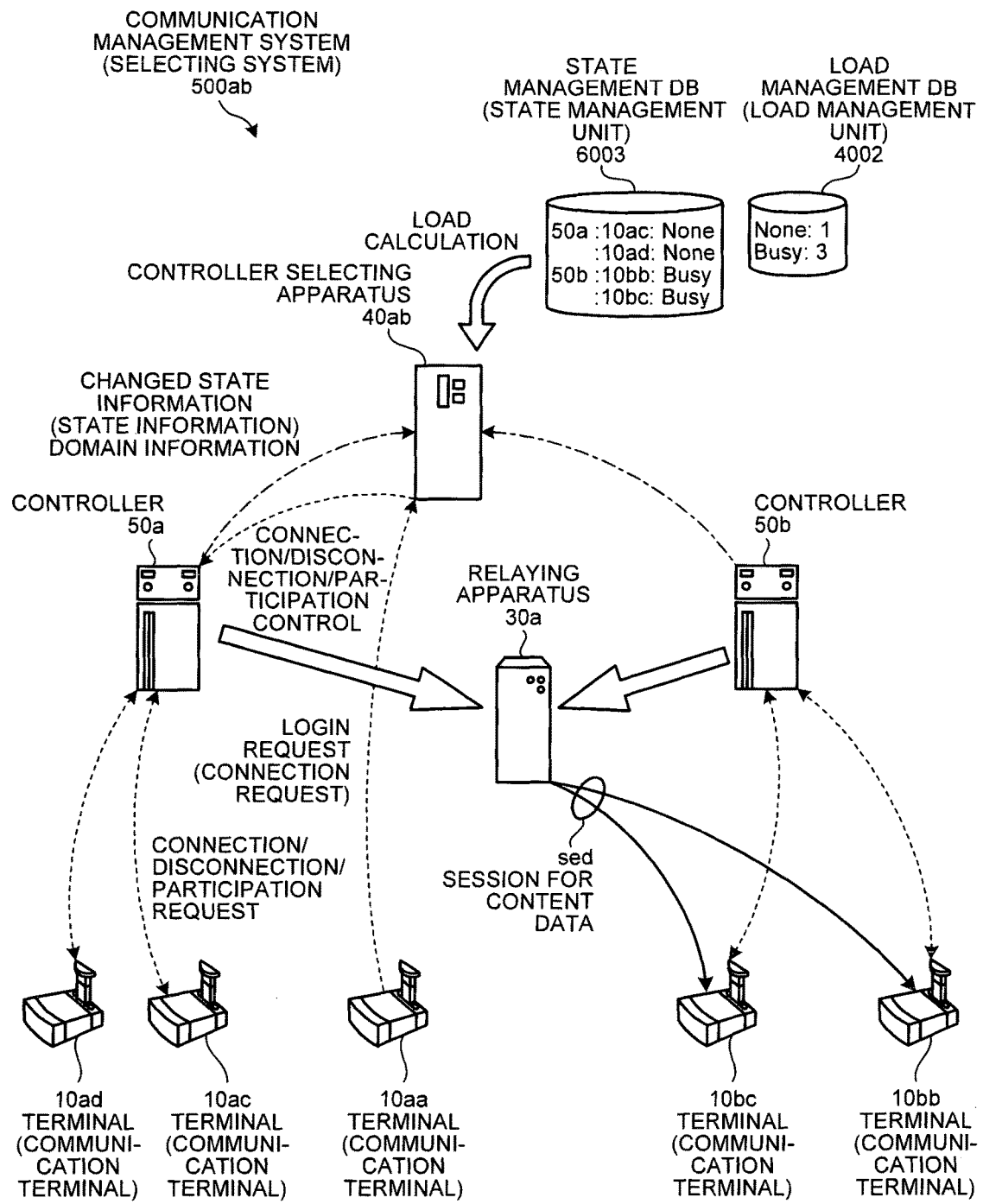
FIG. 17 is a conceptual diagram illustrating the state of the transmission and reception of various types of information in the communication system.

Next, the processing and operation of the controller selecting apparatus 40, the controller 50, the management apparatus 60, the terminal 10, and the like will be described with reference to FIG. 17. FIG. 17 is a conceptual diagram illustrating the state of the transmission and reception of various types of information in the communication system 1.

According to an embodiment, the communication system 1 includes a plurality of controllers 50 that control the session for content data between the terminals 10. Based on the respective pieces of processing of the controller selecting apparatus 40 and the management apparatus 60 constituting part (an example of a selecting system) of the management system 500ab, the controller 50 to be connected to the terminal 10 is selected out of the controllers 50. The state management DB 6003 (an example of a state management unit) of the management apparatus 60 manages, for each of the controllers (50a, 50b), the state information indicating the state of communication of the terminal 10 connected to the controller 50. The load management DB 4002 (an example of a load management unit) of a controller selecting apparatus 40ab of the management system 500ab manages, for each state of communication of the terminal 10, the load information indicating the degree of load related to the control generated in the state. The transmitter/receiver 41 (an example of an accepting unit) of the controller selecting apparatus 40ab accepts login request information (an example of connection request information) to the controller 50 from a terminal 10aa that is not connected to the controller 50. The load calculating unit 45 (an example of a calculating unit) of the controller selecting apparatus 40ab calculates, for each of the controllers (50a, 50b), the degree of load related to the control based on the state information managed in the state management DB 6003 and the load information managed in the load management DB 4002. The selecting unit 46 (an example of a selecting unit) of the controller selecting apparatus 40ab selects the controller 50 to be connected to the terminal 10 as the login requester terminal (an example of a connection requester t terminal) based on the degree of the load calculated for each of the controllers 50 by the load calculating unit 45. In this case, the degree of load related to the control to be performed in each of the states is managed in the load management DB 4002, and an effect is produced that there is no need to perform complicated processing such as measuring the load on the network for each selection of the controller 50. The degree of load may include at least one of pieces of information indicating numeral values, levels, and steps indicating the magnitude of a load.

The load information can include load information (an example of first load information) corresponding to a state in which the terminal 10 is in communication with another terminal 10 and load information (an example of second load information) corresponding to a state in which the terminal 10 is not in communication with any other communication terminal. In this case, the load information can be set so that the degree of load corresponding to the state in communication with the other terminal 10 is larger than the degree of load corresponding to the state not in communication with any other communication terminal. This setting can, in a communication system in which a load related to control is larger when the terminal 10 is in communication than when it is in a standby state, accurately distribute the load related to the control.

When each of the controllers 50 is connected to a plurality of terminals 10, the load calculating unit 45 calculates, for each of the controllers 50, a load related to the control based on the number of communication terminals 10 connected to the controller 50. For example, when terminals (10ac, 10ad) connected to the controller 50a are each not in communication with any other terminal 10, the load calculating unit 45 doubles the value of the load information "1" corresponding to the state information "None" based on the number of the terminals 10 that are not in communication with any other terminal 10 "2," thereby calculating the degree of load "2" related to the control. When terminals (10bc, 10bb) connected to the controller 50b are each in communication, the load calculating unit 45 doubles the value of the load information "3" corresponding to the state information "Busy" based on the number of the terminals 10 that are in communication "2," thereby calculating the degree of load "6" related to the control. This operation can measure the load related to the control more accurately based on the states of the terminals 10 and the number of the terminals 10 connected to the controller 50.

The communication management system 500ab according to the present embodiment includes the controller selecting apparatus 40ab and a plurality of controllers 50 that performs the control related to the session sed for content data in response to a request form the terminal 10.

The controller 50 manages the state information indicating the state of the terminal 10 based on the various management information transmitted from the terminal 10 and includes the transmitter/receiver 51 (an examples of a transmitter) that, when the state of the terminal 10 managed by the corresponding controller 50 is changed, transmits the state information indicating the post-change state to the management apparatus 60. This configuration enables the state management DB 6003 of the management apparatus 60 to manage the states of the respective terminals 10 connected to the respective controllers 50 in real time.

In this case, the transmitter/receiver 51 transmits the state information in association with the domain information of the corresponding controller 50 to the management apparatus 60. This operation enables the management apparatus 60 to discriminate the controller 50 as a connection destination of the terminal 10, and for each of the controllers 50, the states of the terminals 10 connected to the controller can be managed.

The communication system 1 according to the present embodiment includes the communication management system 500ab and the terminal 10 that transmits login request information to the controller 50 to the controller selecting apparatus 40ab.

Next, detail of processing in the communication system 1 according to the present embodiment will be described.

Inter-Controller Cooperation

Figure 18:
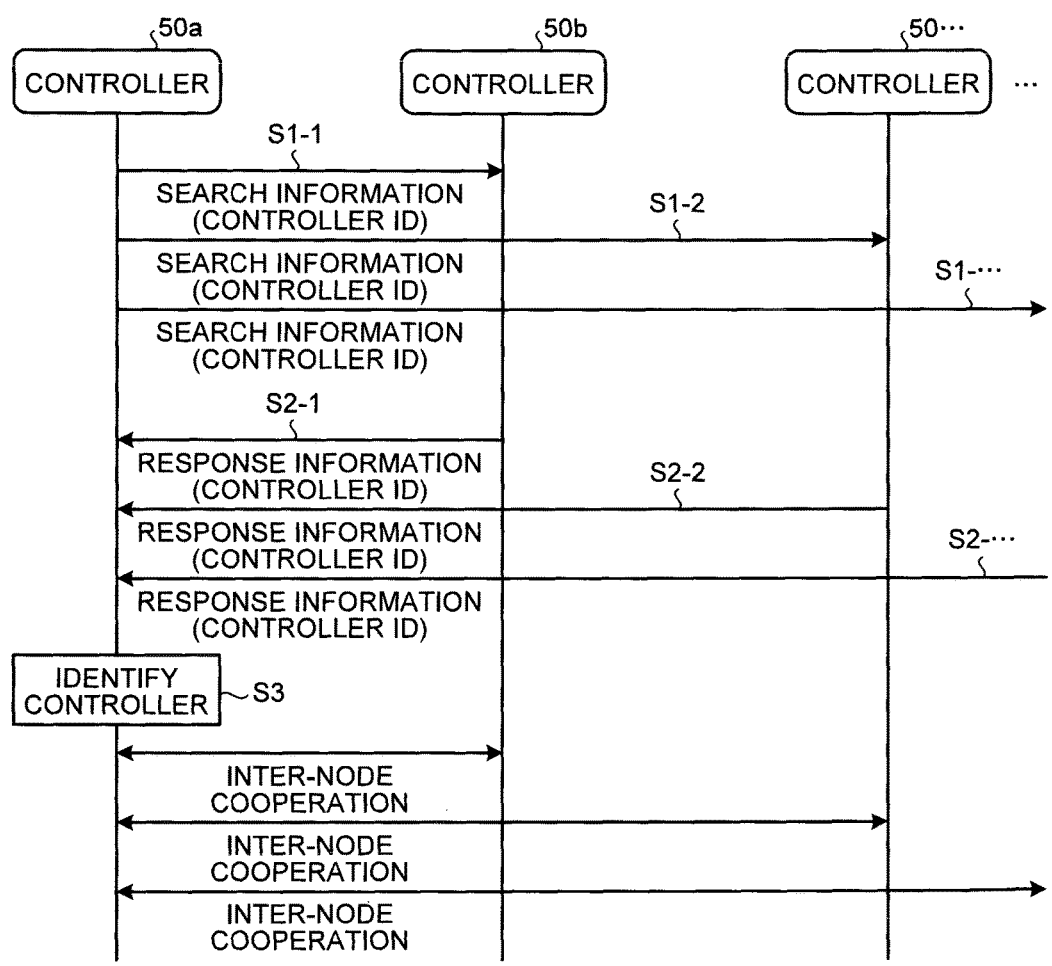
FIG. 18 is a sequence diagram illustrating inter-node cooperation processing.

First, inter-node cooperation between the controllers 50 present within the same domain will be described with reference to FIG. 18. FIG. 18 is a sequence diagram illustrating the inter-node cooperation. As illustrated in FIG. 18, the controller 50a performs searching for the other controller 50 located in the same segment (Steps S1-1, S1-2, S1- . . . ). In this case, the transmitter/receiver 51 of the controller 50a transmits, by means of broadcasting, search information for searching the segment in which the controller 50a is located. The search information includes a controller ID for identifying the controller 50a. The transmitter/receiver 51 of each controller 50 that has received the search information from the controller 50a transmits response information to the controller 50a (Steps S2-1, S2-2, S2- . . . ). The response information includes each controller ID for identifying each controller 50 that has received the search information. When the transmitter/receiver 51 of the controller 50a receives the response information from the other controller 50, the identifying unit 58 identifies the other controller 50 being in operation located in the same segment based on the response information (Step S3).

When the controller 50 being in operation arranged in the same segment is identified at Step S3, the controller 50a performs the inter-node cooperation with the identified management system (50b, 50 . . . ). In an embodiment according to the present invention, the inter-node cooperation processing means that one controller 50 is regarded as a node, a plurality of controllers 50 have the same domain name, and the controllers 50 can be operated cooperatively with each other. When the controller 50a and the controller 50b perform the inter-node cooperation, for example, the controller 50a and the controller 50b operate as if they are the same controller 50. In other words, both when the terminal 10 is connected to the controller 50a and when it is connected to the controller 50b, the same processing is performed in the controllers 50.

The inter-node cooperation at Steps S1 to S3 is performed at given time intervals. This enables the controller 50a to perform inter-node release when the coordinated controller 50 undergoes maintenance or goes down. This processing causes the controllers 50 in inter-node cooperation, even when inter-node cooperation or release with any controller 50 constituting the management system 500ab is performed, to operate in an interlocked manner as if they operate singly.

Also for the controller 50 other than the controller 50a constituting the management system 500ab, the inter-node cooperation with the other controller 50 present in the same domain is performed. This processing is similar to the processing at Steps S1 to S3, and the description thereof is omitted.

Processing at Preparatory Stage

Figure 19:
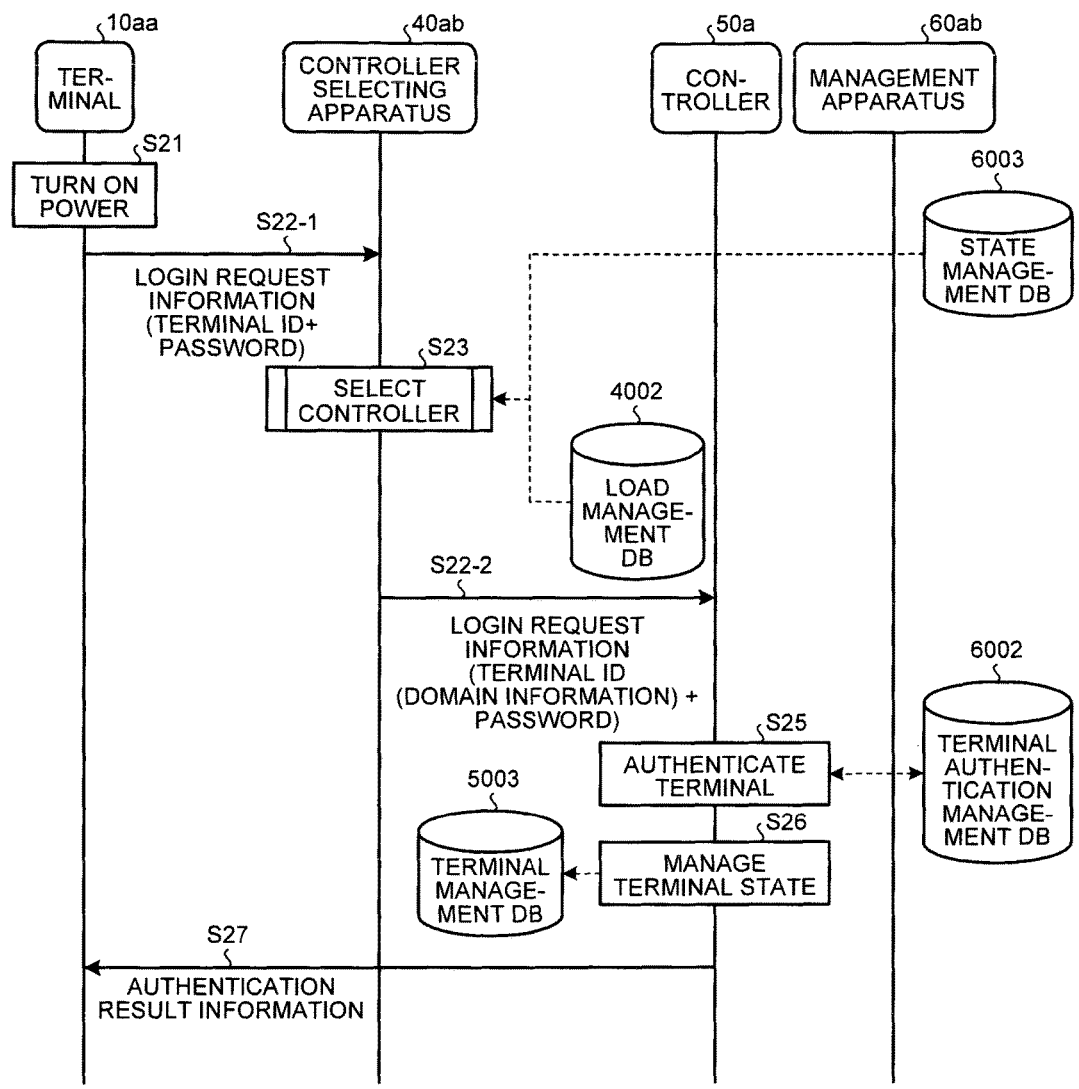
FIG. 19 is a sequence diagram illustrating the processing of a preparatory stage for starting communication between terminals.

Described next with reference to FIG. 19 is processing to select the controller 50 to be connected to the terminal 10aa that requested a login. FIG. 19 is a sequence diagram illustrating the processing in a preparatory stage for starting communication between terminals. In FIG. 19, various types of management selecting information is transmitted and received entirely through the session sei for management information illustrated in FIG. 2.

First, when the user of the terminal 10aa turns on the power switch 109 illustrated in FIG. 4, the operation input accepting unit 12 illustrated in FIG. 6 accepts the power-on and turns on the power (Step S21). The login requesting unit 13 automatically transmits login request information indicating a login request to the controller selecting apparatus 40ab via the communication network 2 with the acceptance of the power-on as a trigger (Step S22-1). The trigger for transmitting the login request information is not limited to the power-on and may be the acceptance of operation input by the user via the operation input accepting unit 12. The login request information includes a terminal ID "01aa" for identifying the terminal 10aa as the corresponding terminal that is the requester terminal or the user of the terminal 10aa and a password. The terminal ID and the password are pieces of data read from the storage unit 1000 via the storage/reading processing unit 19 and transmitted to the transmitter/receiver 11. The terminal ID shown in this example is merely an example of information for use in authentication, and the login request information is only required to include at least identification for identifying the terminal 10 or the user of the terminal 10 and is not limited to this form.

Figure 20:
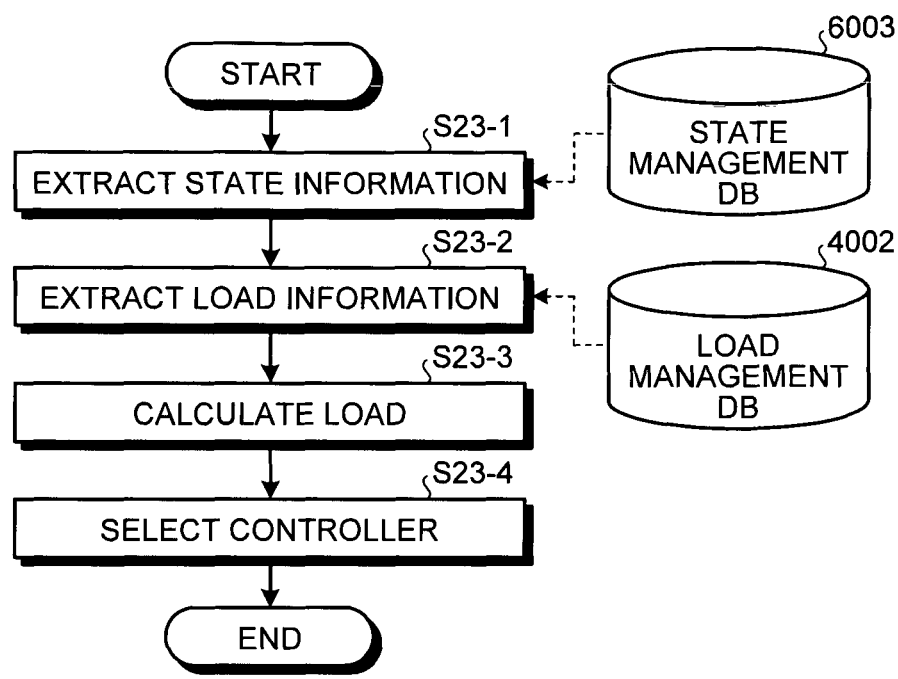
FIG. 20 is a flow diagram illustrating processing to select a controller.

The login request information transmitted from the terminal 10aa is accepted by the transmitter/receiver 41 of the controller selecting apparatus 40ab. Upon acceptance of this login request information, in order to distribute the load related to the control of the session sed for content data, the controller selecting apparatus 40ab selects the controller 50 to be connected to the terminal 10aa out of a plurality of controllers 50 (Step S23). The processing to select the controller 50 will be described with reference to FIG. 20. FIG. 20 is a flow diagram illustrating processing to select the controller 50.

The extracting unit 44 of the controller selecting apparatus 40ab extracts, for each of the controllers (50a, 50b) provided in the management system 500ab, the pieces of state information indicating the states of communication of the respective terminals 10 connected to the corresponding controller from the state management table (refer to FIG. 8) (Step S23-1). In this case, the extracting unit 44 of the controller selecting apparatus 40ab requests extraction of the pieces of state information of the respective terminals 10 connected to the each of the controllers (50a, 50b) via the transmitter/receiver 41. In response to this request, the extracting unit 64 of the management apparatus 60ab first searches the state management table (refer to FIG. 8) with the domain information of the controller 50a "jp1.oo.com" as a search key, thereby extracting the state information "None, None" indicating the states of communication of the terminals (10ac, 10ad) including the above domain information in their terminal IDs. Similarly, the extracting unit 64 of the management apparatus 60ab searches the state management table (refer to FIG. 8) with the domain information of the controller 50b "jp2.oo.com" as a search key, thereby extracting the state information "Busy, Busy" indicating the states of communication of the terminals (10bb, 10bc) including the above domain information in their terminal IDs. The respective pieces of extracted information "None, None, busy, Busy" are transmitted to the controller 50a by the transmitter/receiver 61 in association with the respective pieces of corresponding domain information "j1.oo.com, jp1 . . . , jp2 . . . , jp2 . . . ."

Next, the extracting unit 44 searches the load management table (refer to FIG. 9) with the pieces of state information "None, Busy" extracted at Step S23-1 as a search key, thereby extracting pieces of corresponding load information "1, 3" (Step S23-2).

Next, the load calculating unit 45 of the controller selecting apparatus 40ab calculates, for each of the controllers 50, the degree of load related to the control based on the pieces of state information extracted at Step S23-1 and the pieces of load information extracted at Step S23-2 (Step S23-3). In this case, the pieces of state information of the respective terminals (10ac, 10ad) connected to the controller 50a are "None, None," and the degree of load related to the control of the controller 50a is calculated to be "2" from the sum of the respective pieces of load information "1, 1" corresponding to the respective pieces of state information "None, None." Similarly, the pieces of state information of the respective terminals (10bb, 10bc) connected to the controller 50b are "Busy, Busy," and the degree of load related to the control of the controller 50b is calculated to be "6" from the sum of the respective pieces of load information "3, 3" corresponding to "Busy, Busy."

Next, the selecting unit 46 of the controller selecting apparatus 40ab selects the controller 50 having the smallest degree of load related to the control based on the degree of the load calculated at Step S23-3 (Step S23-4). In the present embodiment, based on the degree of the load of the controller 50a "2" and the degree of the load of the controller 50b "6", the controller 50a is selected as the controller 50 to be connected to the terminal 10aa by the selecting unit 46.

When the controller 50a is selected as the controller 50 to be connected to the terminal 10aa, the controller selecting apparatus 40ab performs control so that the terminal 10aa and the controller 50a are connected to each other. In this case, the transmitter/receiver 41 of the controller selecting apparatus 40ab transfers the login request information transmitted from the terminal 10aa to the selected controller 50a (Step S22-2, refer to FIG. 19). The login request information includes the terminal ID "01aa" and the password for identifying the terminal 10aa or the user of the terminal 10aa.

The login request information transmitted from the controller selecting apparatus 40ab is accepted by the transmitter/receiver 51 of the controller 50a. Next, the authenticating unit 52 of the controller 50a requests to authenticate by determining whether the terminal ID and the password included in the login request information received via the transmitter/receiver 51 is managed in the terminal authentication management table (refer to FIG. 11) (Step S25). In this case, the transmitter/receiver 51 of the controller 50*a* transmits the terminal ID and the password included in the login request information to the management apparatus 60*ab*, thereby requesting to authenticate the terminal 10*aa*. The extracting unit 64 of the management apparatus 60*ab* extracts the password corresponding to the terminal ID included in the login request information in the terminal authentication management table. If the extracted password and the password transmitted from the controller 50*a* match, the transmitter/receiver 61 of the management apparatus 60*ab* transmits an authentication result indicating that the terminal 10*aa* has a valid authority to the controller 50*a*. If the extracted password and the password transmitted from the controller 50*a* do not match, the transmitter/receiver 61 of the management apparatus 60*ab* transmits an authentication result indicating that the terminal 10*aa* do not have a valid authority to the controller 50*a*. The authenticating unit 52 manages the same terminal ID and password, and when determined to be a login request from the terminal 10 having the valid authority, the first changing unit 53*a* of the state management unit 53 stores in the terminal management table (refer to FIG. 16) the terminal ID of the terminal 10*aa* and the state information indicating the operation state "Online" in association with each other (Step S26). This causes the terminal management table to manage the terminal ID "01aa" and the state information "Online" in association with each other.

The transmitter/receiver 51 of the controller 50*a* transmits authentication result information indicating the authentication result obtained by the authenticating unit 52 to the terminal 10*aa* as the requester terminal that requested the login via the communication network 2 (Step S27). The present embodiment continues to describe below the case determined to be a terminal having a valid authority by the authenticating unit 52. The authentication result information is received by the transmitter/receiver 11 of the terminal 10*aa*. This operation causes the session sei for management information between the terminal 10*aa* and the controller 50*a* to be established and enables the terminal 10*aa* to transmit and receive the various types of management information to and from the controller 50*a*.

State Management

Figure 21:
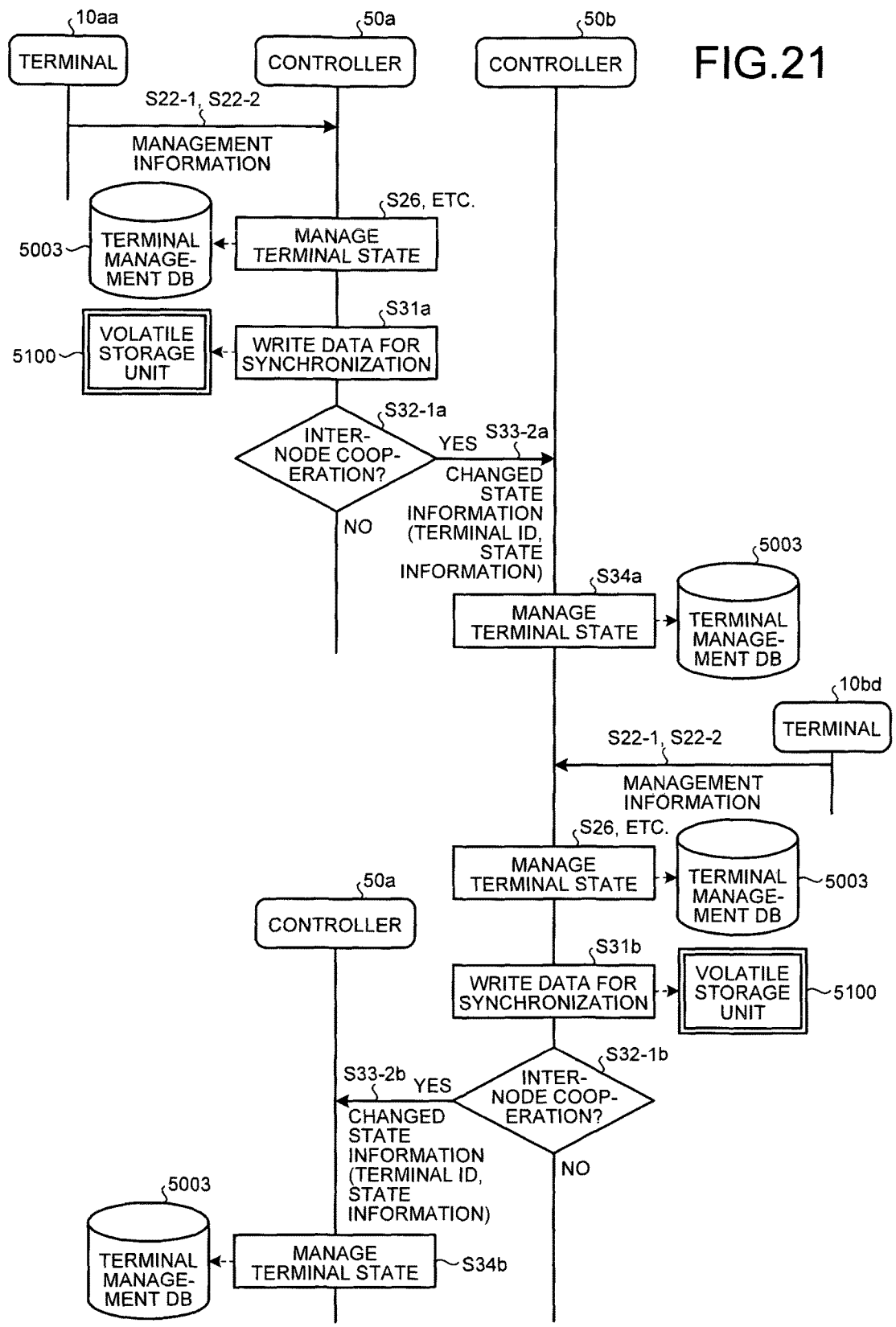
FIG. 21 is a sequence diagram illustrating processing to synchronize the state information of terminals.

Described next with reference to FIG. 21 is, as an example of the inter-node cooperation processing, processing to synchronize the operation states of the terminals 10 managed by the respective controllers 50 constituting the management system 500*ab* between the controllers 50. FIG. 21 is a sequence diagram illustrating processing to synchronize operation information of terminals. In FIG. 21, various types of management information is transmitted and received entirely by the session sei for management information illustrated in FIG. 2.

When the operation state of the terminal 10 managed in the terminal management table of each controller 50 is changed (refer to Step S26), the controllers 50 subjected to the inter-node cooperation synchronize the changed operation state. The following describes a case of synchronizing state information between the controller 50*a* and the controller 50*b*. When the state information managed in the terminal management table (refer to FIG. 16A) is changed by the first changing unit 53*a* based on various types of management information from the terminal 10 (the terminal 10*aa* in this example) connected to the controller 50*a*, the storage/reading processing unit 59 stores in the volatile storage unit 5100 the terminal ID "01aa@jp1.oo.com" of the terminal 10*aa* and the state information (Online, for example) indicating the changed operation state of the terminal 10*aa* in association with each other as local data for synchronization (Step S31*a*).

Next, if there is another controller subjected to the inter-node cooperation (Yes at Step S32-1*a*), the transmitter/receiver 51 of the controller 50*a* transmits changed state information indicating the changed state to the controller 50*b* subjected to the inter-node cooperation (Step S33-2*a*). The changed state information includes the local data for synchronization stored in the volatile storage unit 5100, that is, the terminal ID "01aa@jp1.oo.com" and the state information "Online."

The changed state information transmitted from the controller 50*a* is received by the transmitter/receiver 51 of the controller 50*b*. The second changing unit 53*b* of the state management unit 53 of the controller 50*b* changes the state information managed in association with the terminal ID "01aa" into "Online" based on the changed state information in the terminal management table (refer to FIG. 16) (Step S34*a*).

In a similar manner to the processing at Step S26 and the like, when the operation state of the terminal 10 managed in the terminal management table of the controller 50*b* is changed by the first changing unit 53*a* of the controller 50*b*, the controller 50*b* and the other controller 50*a* subjected to the inter-node cooperation synchronize the changed operation state. This processing is similar to the processing Steps S31*a* to Step S35*a*, and the description thereof is omitted (Step S31*b* to Step S35*b*).

Relaying Apparatus Selection

Figure 22:
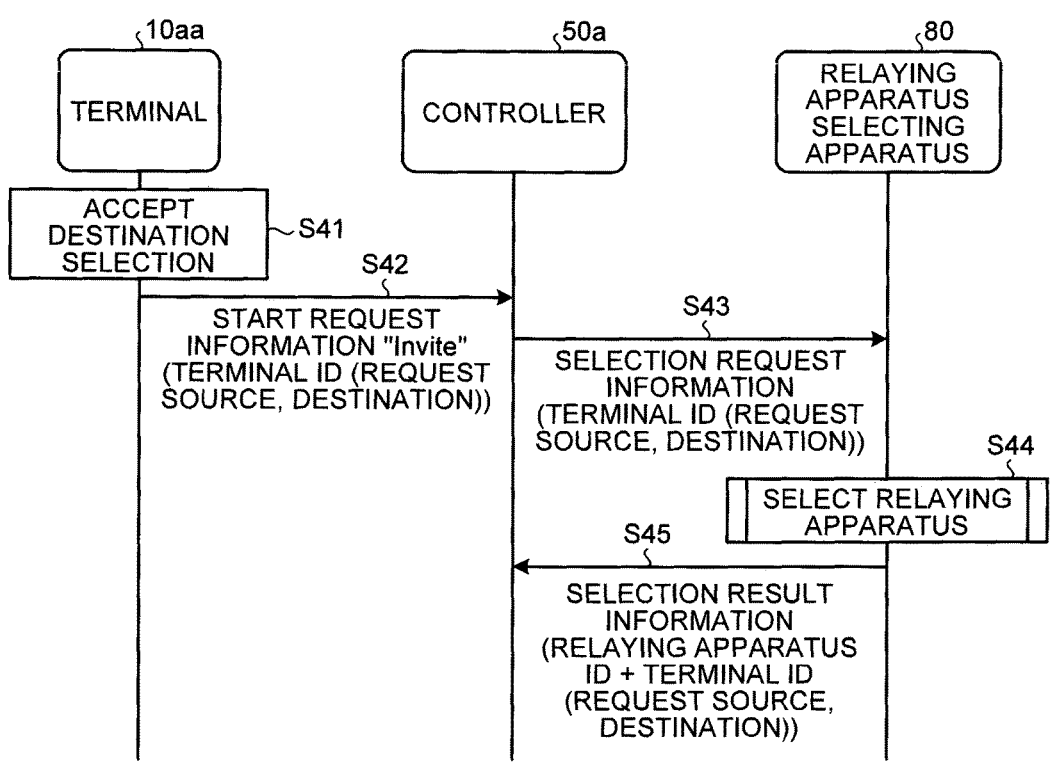
FIG. 22 is a sequence diagram illustrating processing to select a relaying apparatus.

The following describes processing to select the relaying apparatus 30 for use in relaying content data transmitted and received between the terminals 10 before starting communication between the terminal 10*aa* and the terminal 10*bd* with reference to FIG. 22. FIG. 22 is a sequence diagram illustrating processing to select a relaying apparatus. In FIG. 22, various types of management information is transmitted and received entirely by the session sei for management information illustrated in FIG. 2.

First, the user of the terminal 10*aa* presses down the operation button 108 illustrated in FIG. 3 to select the terminal 10*bd* as a destination candidate, thereby causing the operation input accepting unit 12 illustrated in FIG. 6 to accept a request to start communication (Step S41). The transmitter/receiver 11 of the terminal 10*aa* transmits, to the controller 50*a*, the start request information "Invite" that includes the terminal ID "01aa" of the terminal 10*aa* as the requester terminal of the start of communication and the terminal ID "01bd" of the terminal 10*bd* as a destination and indicates request to start communication (Step S42). The transmitter/receiver 51 of the controller 50*a* receives the start request information, thereby accepting the request to start communication between the terminal 10*aa* and the terminal 10*bd*. The transmitter/receiver 51 then transmits, to the relaying apparatus selecting apparatus 80, the selection request information that includes the terminal ID "01aa" of the terminal 10*aa* and the terminal ID "01bd" of the terminal 10*bd* and indicates a request to select the relaying apparatus 30 for use in relaying content data transmitted and received between the terminal 10*aa* and the terminal 10*bd* (Step S43).

Figure 23:
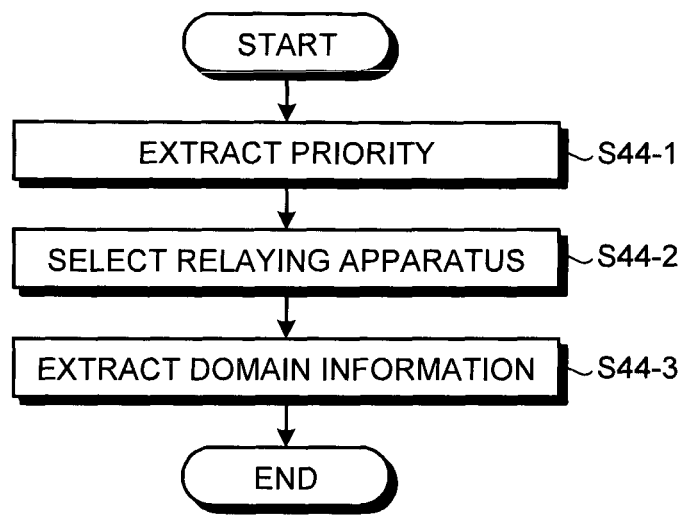
FIG. 23 is a flow diagram illustrating processing to select a relaying apparatus.

The transmitter/receiver 81 of the relaying apparatus selecting apparatus 80 receives the selection request information, thereby accepting the request to select the relaying apparatus 30. The selecting unit 82 then selects at least one relaying apparatus 30 for use in relaying the content data transmitted and received between the terminal 10*aa* and the terminal 10*bd* out of the relaying apparatuses 30 managed in the relaying apparatus selection management table (refer to FIG. 15) (Step S44). The processing to select the relaying apparatus 30 will be described in more detail with reference to FIG. 23. FIG. 23 is a flow diagram illustrating processing to select a relaying apparatus.

First, the selecting unit 82 extracts, for each of the relaying apparatus IDs managed in the relaying apparatus selection management table, priority associated with the terminal ID "01aa" of the terminal 10aa as the requester terminal and priority associated with the terminal ID "01bd" of the terminal 10bd as the destination (refer to FIG. 15) (Step S44-1). The selecting unit 82 then calculates, for each of the relaying apparatus IDs, the sum of the extracted priorities and selects the relaying apparatus ID whose calculated sum of the priorities is the largest (Step S44-2). In the present embodiment, the sum of the priorities corresponding to the relaying apparatus ID "111a" is "5," which is the largest. The selecting unit 82 selects the relaying apparatus ID managed in the relaying apparatus selection management table, thereby also extracting the domain information included in the relaying apparatus ID (Step S44-3).

Upon completion of the selection of the relaying apparatus 30, the transmitter/receiver 81 of the relaying apparatus selecting apparatus 80 transmits, to the controller 50a, selection result information that includes the relaying apparatus ID identifying the selected relaying apparatus, the terminal ID "01aa" of the terminal 10aa, and the terminal ID "01bd" of the terminal 10bd and indicates the result of the selection, thereby outputting it (Step S45).

Communication Start Processing

Figure 24:
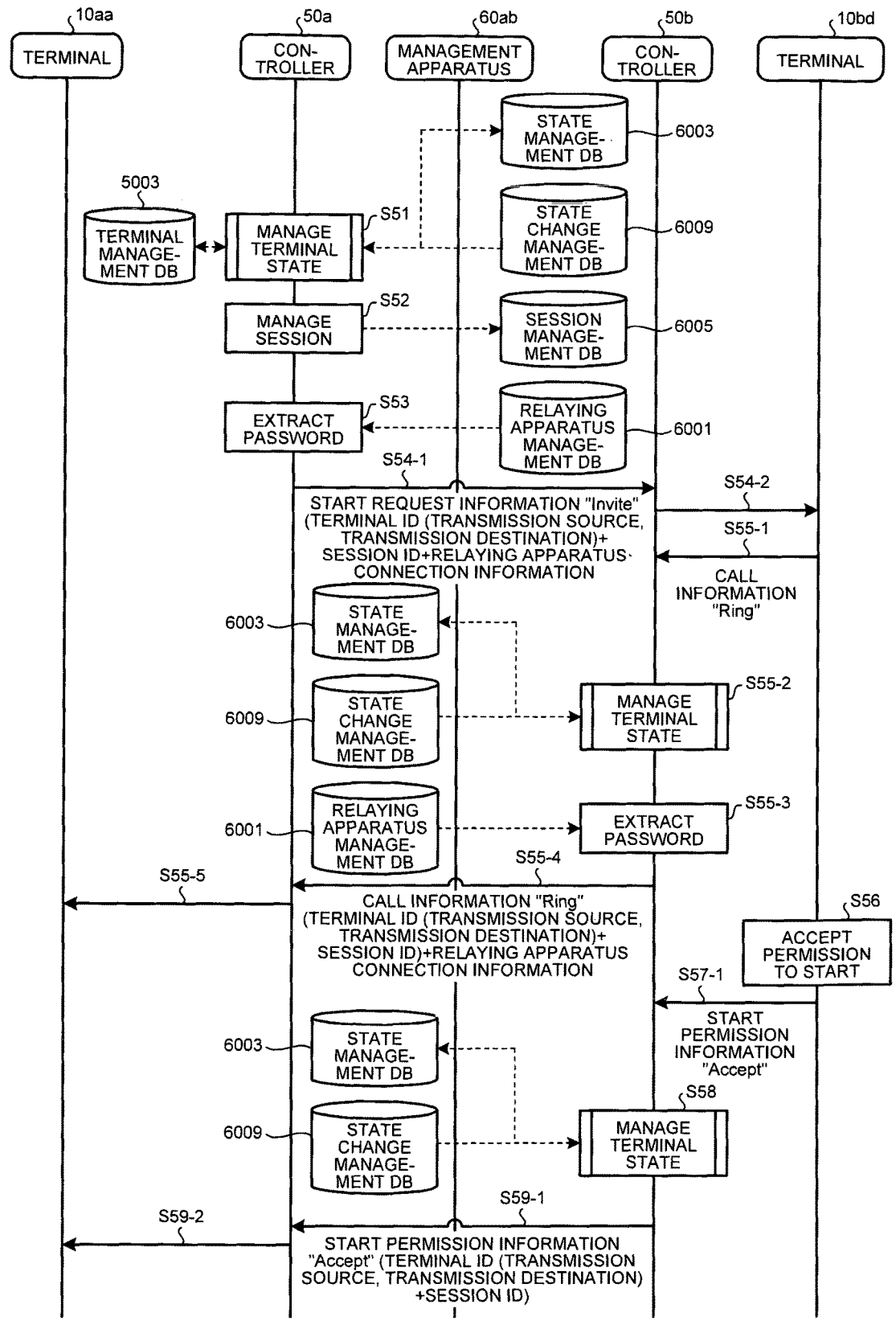
FIG. 24 is a sequence diagram illustrating processing to request the start of communication.

Next, processing related to the start of communication between the terminal 10aa and the terminal 10bd will be described with reference to FIG. 24. FIG. 24 is a sequence diagram illustrating processing to request the start of communication. In FIG. 24, various types of management information is transmitted and received entirely by the session sei for management information illustrated in FIG. 2.

Figure 25:
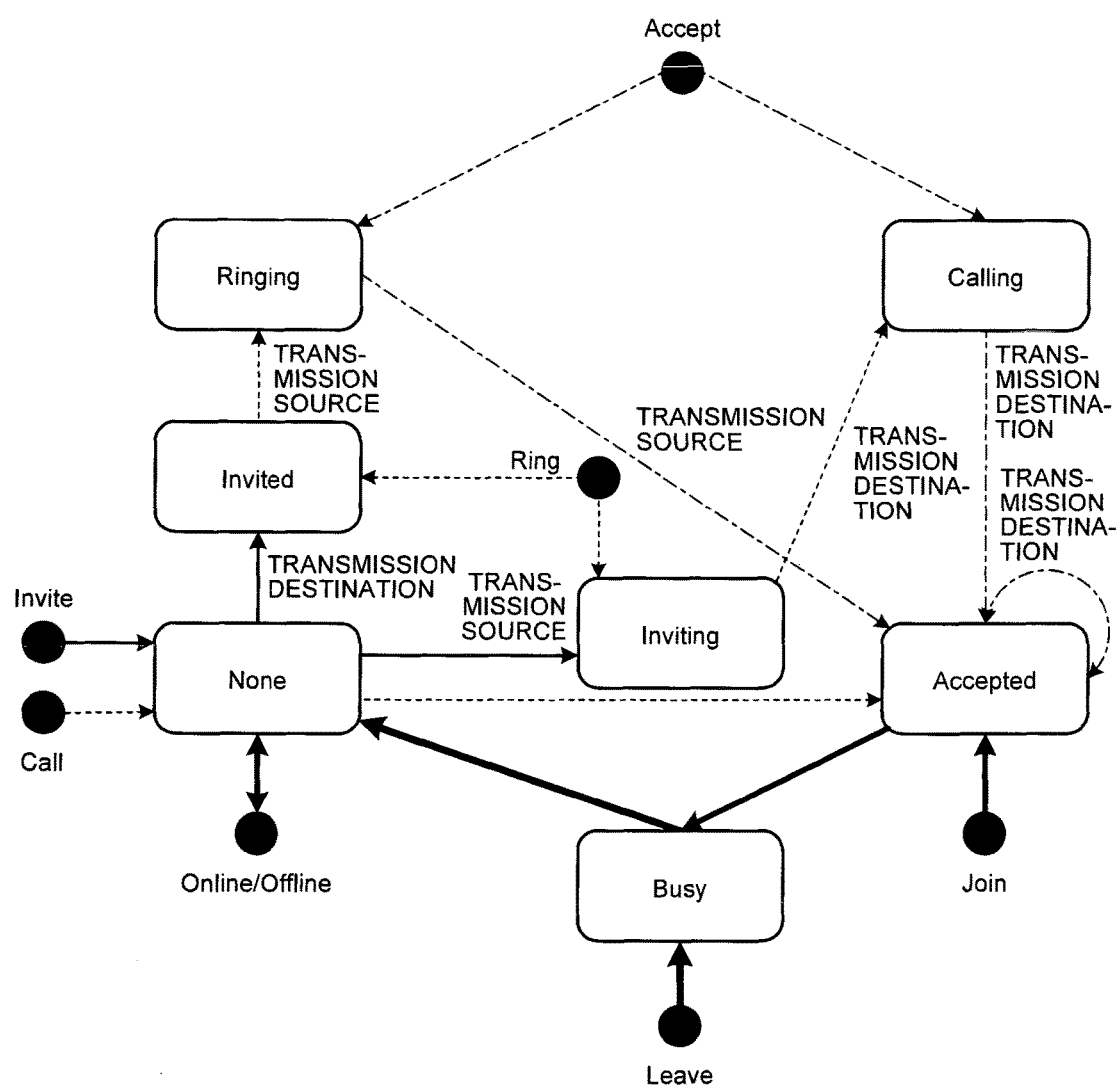
FIG. 25 is a state transition diagram illustrating transitions between states of a terminal.
Figure 26:
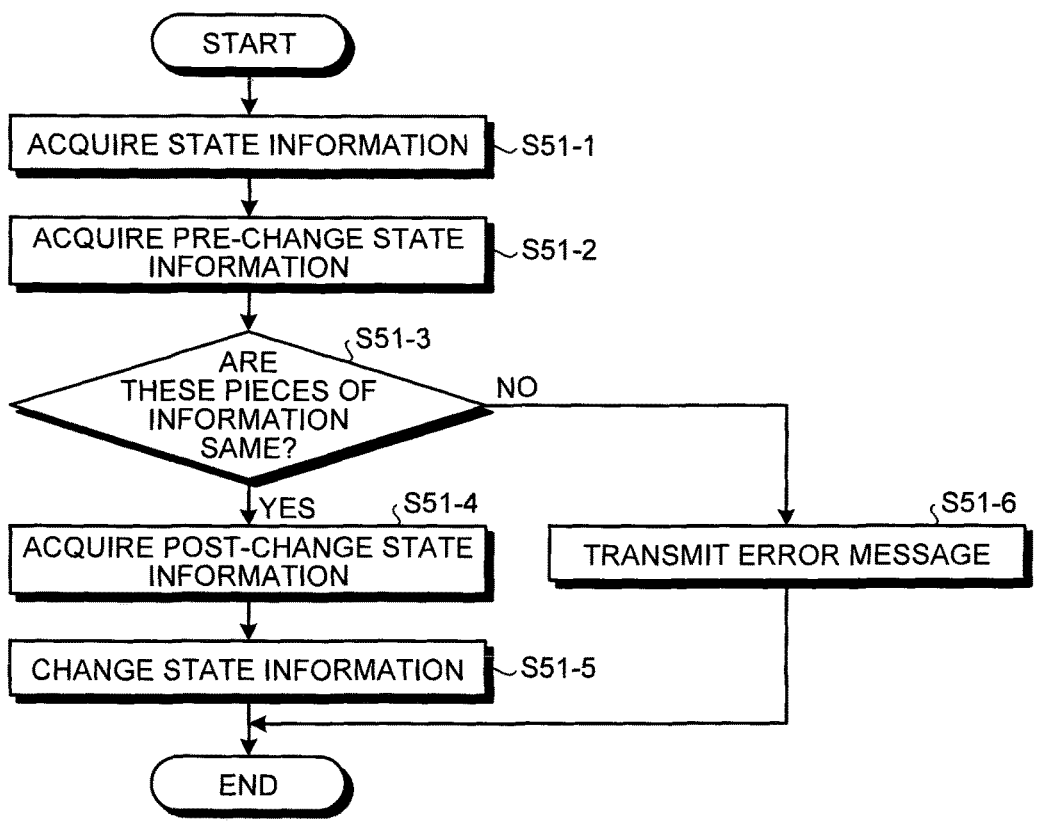
FIG. 26 is a flow diagram illustrating processing to change the state of a terminal.

First, the state management unit 53 changes the state information of the terminal 10 related to a start request among the terminals 10 managed in the state management table (refer to FIG. 8) based on the start request information "Invite" transmitted from the terminal 10aa at Step S42 (Step S51). The processing at Step S51 will be described in detail with reference to FIG. 25 and FIG. 26. FIG. 25 is a state transition diagram illustrating transitions between states of a terminal. FIG. 26 is a flow diagram illustrating processing to change the state of a terminal.

In the present embodiment, the state management unit 53 changes the state of the terminal 10 in accordance with the rules about changes of the state illustrated by the state transition diagram in FIG. 25. When receiving the start request information "Invite" from the terminal 10, for example, the state information "None" of the terminal 10 is changed into the state information "Inviting" or the state information "Invited." Also when management information "Ring, Accept, Join, Leave" other than "Invite" is transmitted from the terminal 10, the state management unit 53 changes the state of the terminal 10 in accordance with the rules about changes illustrated by the state transition diagram in FIG. 25. The detailed description thereof is omitted. Although the present embodiment will describe an example using the state change management table (refer to FIG. 14) in order to achieve changes of the state by the state management unit 53, it is not limited to the method using the state change management table so long as a communication state can be changed in accordance with the rules illustrated in FIG. 25.

First, the state management unit 53 acquires the state information "None" of the terminal 10aa as the transmission source of the start request information and the state information of the terminal 10bd as the transmission destination from the state management table (refer to FIG. 8 (Step S51-1). In this case, the state management unit 53 of the controller 50a transmits the terminal ID of the terminal 10aa as the start requester terminal and the terminal ID of the terminal 10bd as the transmission destination of the start request information to the management apparatus 60ab via the transmitter/receiver 51, thereby requesting to extract corresponding pieces of state information. The extracting unit 64 of the management apparatus 60ab extracts the pieces of state information corresponding to the respective terminal IDs from the state management table. The extracted pieces of state information are transmitted to the controller 50a via the transmitter/receiver 61.

Next, the state management unit 53 acquires the pre-change state information "None" of the terminal 10 as the transmission source and the transmission destination corresponding to the start request information "Invite" as management information from the state change management table (refer to FIG. 14B) (Step S51-2). In this case, the state management unit 53 of the controller 50a transmits the start request information "Invite" to the management apparatus 60ab via the transmitter/receiver 51 and searches the state change management table, thereby requesting to search for the pre-change state information corresponding to this start request information. The extracting unit 64 of the management apparatus 60ab extracts the pre-change state information corresponding to the start request information in the state change management table. The extracted pre-change state information is transmitted to the controller 50a via the transmitter/receiver 61. Next, the state management unit 53, for the terminal 10aa as the transmission source and the terminal 10bd as the transmission destination separately, compares the state information acquired from the terminal management table and the pre-change state information acquired from the state change management table (refer to FIGS. 14A and 14B) and determines whether these are the same (Step S51-3).

If it is determined that these pieces of information are the same (Yes at Step S51-3), the state management unit 53 acquires the post-change state information "Inviting" of the transmission source and the post-change state information "Invited" of the transmission destination of the change request information "Invite" from the state change management table (Step S51-4). In this case, the state management unit 53 of the controller 50a transmits the start request information "Invite" to the management apparatus 60ab via the transmitter/receiver 51 and searches the state change management table, thereby requesting to search for the post-change state information corresponding to this start request information. The extracting unit 64 of the management apparatus 60ab extracts the post-change state information corresponding to the start request information in the state change management table. The extracted post-change state information is transmitted to the controller 50a via the transmitter/receiver 61.

Next, the first changing unit 53a of the state management unit 53 changes the state information associated with the terminal ID "01aa" of the terminal 10aa as the transmission source into "Inviting" based on the acquired post-change state information in the state management table (refer to FIG. 8) (Step S51-5). Similarly, the first changing unit 53a of the state management unit 53 changes the state information associated with the terminal ID "01bd" of the terminal 10*bd* as the transmission destination into "Invited" based on the acquired post-change state information in the terminal management table. In this case, the state management unit 53 of the controller 50*a* transmits the terminal IDs of the terminals (10*aa*, 10*bd*) as the start requester terminal and the transmission destination of the start request information and the pieces of post-change state information of the respective terminals 10 to the management apparatus 60*ab* via the transmitter/receiver 51, thereby requesting to update the pieces of state information. The storage/reading processing unit 69 of the management apparatus 60*ab* changes the pieces of state information corresponding to the respective terminal IDs based on the received pieces of state information, thereby updating the state management table.

After the state information managed in the state management table (refer to FIG. 8) is updated, if a new terminal 10 transmits login request information to the controller selecting apparatus 40*ab*, a load related to the control is calculated based on the post-change state information.

After the pieces of state information of the respective terminals (10*aa*, 10*bd*) are changed by the first changing unit 53*a* of the controller 50*a*, the first changing unit 53*a* changes the operation states of the respective terminals (10*aa*, 10*bd*) managed in the terminal management table (refer to FIG. 16) from "Online" into "Online (in conference)". The post-change operation states are synchronized between the controller 50*a* and the controller 50*b* based on the processing at Step S31*a* to Step S35*a*.

If it is determined that the pieces of information are not the same at Step S51-3, it is considered that any terminal 10 is not in a state that can start communication, and the state management unit 53 does not perform the processing to change the states of the respective terminals 10. In this case, the transmitter/receiver 51 transmits an error message to the terminal 10*aa* (Step S51-6) and completes the processing.

Upon completion of the processing to change the state information of the terminal 10, the session management unit 57 generates the session ID "se01@jp.oo.com" for identifying the session sed for content data for performing communication between the terminal 10*aa* and the terminal 10*bd* (Step S52). The session management unit 57 records the generated session ID, the relaying apparatus ID "111a" of the selected relaying apparatus 30*a*, and the terminal IDs "01aa" and "01bd" of the respective terminals (10*aa*, 10*bd*) that start communication in association with each other in the session management table (refer to FIGS. 13A and 13B). In this case, the session management unit 57 of the controller 50*a* transmits the above session ID, relaying apparatus ID, and terminal IDs to the management apparatus 60*ab* via the transmitter/receiver 51, thereby requesting to record these pieces of information in the session management table. The storage/reading processing unit 69 of the management apparatus 60*ab* records the generated session ID, the relaying apparatus ID "111a" of the selected relaying apparatus 30*a*, and the terminal IDs "01aa" and "01bd" of the respective terminals (10*aa*, 10*bd*) that start communication in association with each other in the session management table.

The session management unit 57 searches the relaying apparatus management table (FIGS. 10A and 10B) with the relaying apparatus ID "111a" of the selected relaying apparatus 30*a* as a key, thereby extracting the corresponding password "xxxx" (Step S53). In this case, the session management unit 57 of the controller 50*a* transmits the above session ID and relaying apparatus ID to the management apparatus 60*ab* via the transmitter/receiver 51, thereby requesting to provide notification of the corresponding password. The extracting unit 64 of the management apparatus 60*ab* extracts the password corresponding to the relaying apparatus ID from the relaying apparatus management table. The extracted password is transmitted to the controller 50*a* via the transmitter/receiver 61.

Next, the transmitter/receiver 51 of the controller 50*a* transmits the start request information "Invite" transmitted from the terminal 10*aa* at Step S42 and the session ID "se01" to the terminal 10*bd* via the controller 50*b* (Steps S54-1, S54-2). The terminal ID of the terminal 10*bd* as the transmission destination of the start request information includes the domain information "jp2.oo.com," and the transmitter/receiver 51 can transmit the start request information via the controller 50*b* based on this domain information. The start request information includes the terminal ID "01aa" of the terminal 10*aa* as the transmission source of the start request information and the terminal ID "01bd" of the terminal 10*bd* as the transmission destination. Along with this, the transmitter/receiver 51 of the controller 50*a* transmits the relaying apparatus connection information for connecting to the selected relaying apparatus 30*a* to the terminal 10*bd* via the controller 50*b*. The relaying apparatus connection information includes the relaying apparatus ID "111a" of the relaying apparatus 30*a* and the password "xxxx" for connecting to the relaying apparatus 30*a*.

The transmitter/receiver 11 of the terminal 10*bd* receives the start request information, thereby accepting the request to start communication from the terminal 10*aa*. Upon receiving the start request information, the transmitter/receiver 11 of the terminal 10*bd* transmits call information "Ring" that indicates acceptance of the request to start communication and is for sounding a dial tone at the terminal 10*aa* to the controller 50*b* (Step S55-1). The call information includes the terminal ID "01bd" of the terminal 10*bd* as the transmission source of the call information, the terminal ID "01aa" of the terminal 10*aa* as the transmission destination, and the session ID "se01@jp.oo.com."

The call information transmitted at Step S55-1 is received by the transmitter/receiver 51 of the controller 50*b*. This causes the transmitter/receiver 51 of the controller 50*b* to accept a request to sound a dial tone at the terminal 10*aa*.

The first changing unit 53*a* of the state management unit 53 of the controller 50*b* changes the state information of the terminal 10*aa* managed in the state management table (refer to FIG. 8) into "Calling" and changes the state information of the terminal 10*bd* into "Ringing" based on the call information "Ring" transmitted from the terminal 10*bd* (Step S55-2). Processing to change the pieces of state information of the terminals (10*aa*, 10*bd*) is similar to the processing at Step S51, and the detailed description thereof is omitted.

After the state information managed in the state management table (refer to FIG. 8) is changed, if the new terminal 10 transmits login request information to the controller selecting apparatus 40*ab*, a load related to the control is calculated based on the post-change state information.

In a similar manner to Step S53, the session management unit 57 searches the relaying apparatus management table (FIG. 10) with the relaying apparatus ID "111a" of the selected relaying apparatus 30*a* as a key, thereby extracting the corresponding password "xxxx" (Step S55-3).

The transmitter/receiver 51 of the controller 50*b* transmits the call information "Ring" transmitted from the terminal 10*bd* at Step S55-1 via the controller 50*a* to the terminal 10*aa* (Steps S55-4, S55-5). The terminal ID of the terminal 10*aa* as the transmission destination of the start request information includes the domain information "jp1.oo.com," and the transmitter/receiver 51 can transmit the call information via the controller 50a based on this domain information. This call information includes the terminal ID "01bd" of the terminal 10bd as the transmission source of the call information, the terminal ID "01aa" of the terminal 10aa as the transmission destination, and the session ID. Along with this, the transmitter/receiver 51 of the controller 50b transmits the relaying apparatus connection information for connecting to the relaying apparatus 30a to the terminal 10aa. The relaying apparatus connection information includes the relaying apparatus ID "111a" of the relaying apparatus 30a and the password "xxxx" for connecting to the relaying apparatus 30a.

The transmitter/receiver 11 of the terminal 10aa receives the above call information, thereby accepting a request to sound a ring tone at the terminal 10aa. This enables the voice output unit 15b of the terminal 10aa to sound a dial tone from the speaker 115.

In the terminal 10bd, the voice output unit 15b sounds a ring tone from the speaker 115. This enables the user of the terminal 10bd to know the request to start communication from the terminal 10aa. At the same time, the operation button 108 of the terminal 10bd accepts permission to start communication with the terminal 10aa (Step S56). Upon acceptance of the permission to start communication, start permission information "Accept" indicating permission to start communication is transmitted to the controller 50b (Step S57-1). This start permission information includes the terminal ID "01bd" of the terminal 10bd as the transmission source of the start permission information, the terminal ID "01aa" of the terminal 10aa as the transmission destination, and the session ID "se01@jp.oo.com." This causes the transmitter/receiver 51 of the controller 50b to accept a response to the permission to start by the terminal 10bd.

The first changing unit 53a of the state management unit 53 of the controller 50b changes the state information of the terminal 10aa and the state information of the terminal 10bd managed in the state management table (refer to FIG. 8) into "Accepted" based on the start permission information "Accept" transmitted from the terminal 10bd (Step S58). Processing to change the pieces of state information of the terminals 10 is similar to the processing at Step S51, and the detailed description thereof is omitted.

After the state information managed in the state management table (refer to FIG. 8) is changed, if the new terminal 10 transmits login request information to the controller selecting apparatus 40ab, a load related to the control is calculated based on the post-change state information.

The controller 50b then transmits the start permission information "Accept" transmitted from the terminal 10bd at Step S57-1 to the terminal 10aa via the controller 50a (Steps S59-1, S59-2). The terminal ID of the terminal 10aa as the transmission destination of the start permission information includes the domain information "jp1.oo.com," and the transmitter/receiver 51 can transmit the call information via the controller 50a based on this domain information. This start permission information includes the terminal ID "01bd" of the terminal 10bd as the transmission source of the start permission information, the terminal ID "01aa" of the terminal 10aa as the transmission destination, and the session ID.

Figure 27:
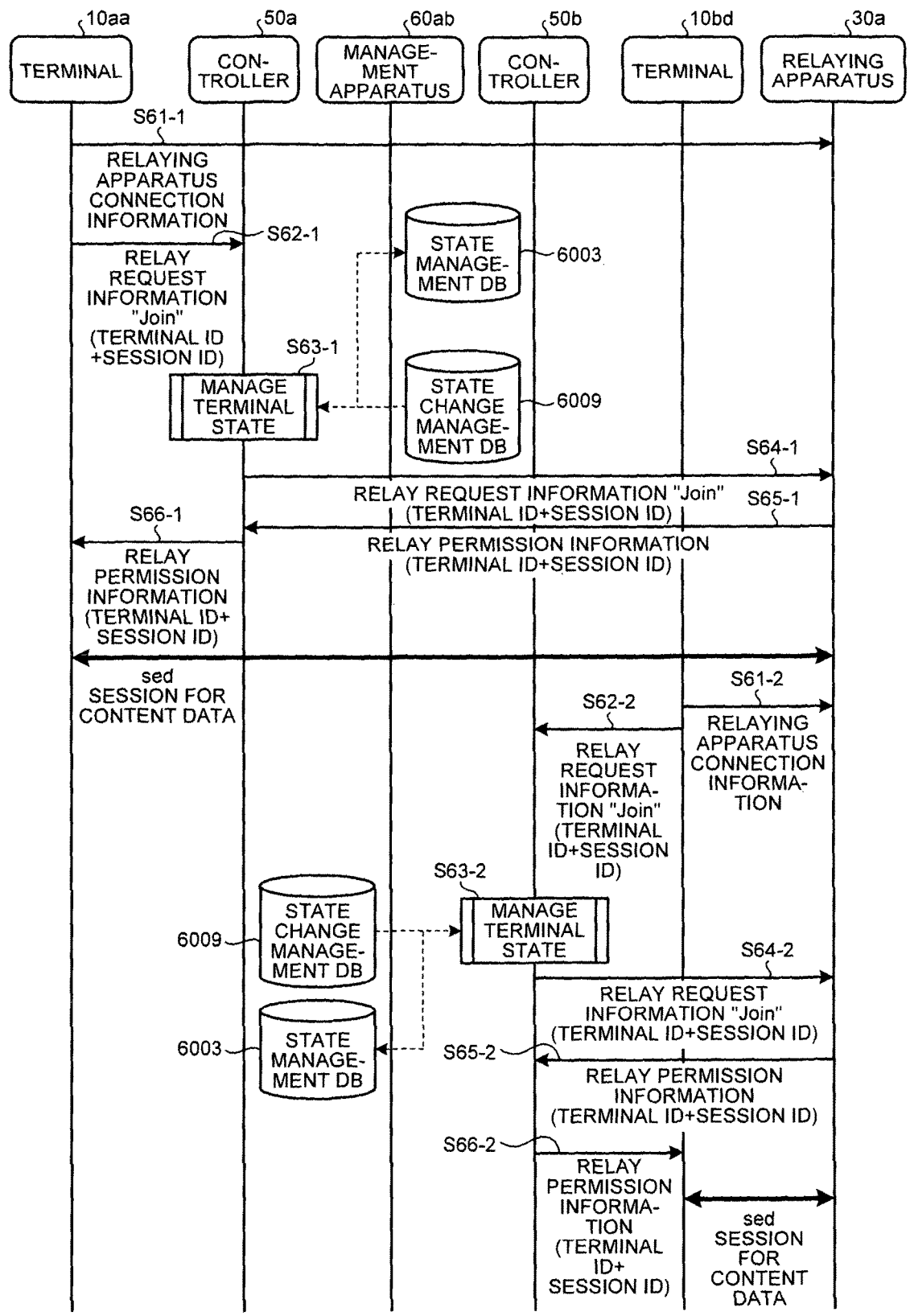
FIG. 27 is a sequence diagram illustrating processing to start communication between terminals.

The following describes processing to start the session sed for content data between the terminals (10aa, 10bd) after the request to start communication is permitted with reference to FIG. 27. FIG. 27 is a sequence diagram illustrating processing to start communication between the terminals 10. In the communication between the terminal 10 and the controller 50 in FIG. 27, various types of management information is transmitted and received by the session sei for management information illustrated in FIG. 2.

First, the terminal 10aa connects to the relaying apparatus 30a based on the relaying apparatus connection information received at Step S55-5 (Step S61-1). The transmitter/receiver 11 of the terminal 10aa then transmits relay request information "Join" indicating a request to start relaying to the controller 50a (Step S62-1). This relay request information includes the terminal ID "01aa" of the terminal 10aa and the session ID "se01@jp.oo.com." This causes the transmitter/receiver 51 of the controller 50a to accept the request to start relaying by the terminal 10aa.

The first changing unit 53a of the state management unit 53 of the controller 50a changes the state information of the terminal 10aa managed in the state management table (FIG. 8) into "Busy" based on the relay request information "Join" transmitted from the terminal 10aa (Step S63-1). Processing to change the state information of the terminal 10 is similar to the processing at Step S51, and the detailed description thereof is omitted.

After the state information managed in the state management table (refer to FIG. 8) is changed, if the new terminal 10 transmits login request information to the controller selecting apparatus 40ab, a load related to the control is calculated based on the post-change state information.

The transmitter/receiver 51 of the controller 50a transmits the relay request information including the terminal ID "01aa" of the terminal 10aa and the session ID "se01" to the relaying apparatus 30a (Step S64-1). Upon acceptance of this relay request information, the transmitter/receiver 31 of the relaying apparatus 30a transmits relay permission information that includes the terminal ID "01aa" of the terminal 10aa and the session ID "se01" and indicates permission to start relaying to the controller 50a (Step S65-1). The transmitter/receiver 51 of the controller 50a transmits the received relay permission information to the terminal 10aa (Step S66-1). This establishes the session sed for content data between the terminal 10aa and the relaying apparatus 30a.

The terminal 10bd connects to the relaying apparatus 30a based on the relaying apparatus connection information received at Step S56 (Step S61-2). The transmitter/receiver 11 of the terminal 10bd then transmits the relay request information "Join" indicating a request to start relaying to the controller 50b (Step S62-2). This relay request information includes the terminal ID "01bd" of the terminal 10bd and the session ID "se01@jp.oo.com." This causes the transmitter/receiver 51 of the controller 50b to accept the request to start relaying by the terminal 10bd.

The first changing unit 53a of the state management unit 53 of the controller 50b changes the state information of the terminal 10bd managed in the state management table (FIG. 8) into "Busy" based on the relay request information "Join" transmitted from the terminal 10bd (Step S63-2). Processing to change the state information of the terminal 10 is similar to the processing at Step S51, and the detailed description thereof is omitted.

After the state information managed in the state management table (refer to FIG. 8) is changed, if the new terminal 10 transmits login request information to the controller selecting apparatus 40ab, a load related to the control is calculated based on the post-change state information.

The transmitter/receiver 51 of the controller 50b then transmits the relay request information including the terminal ID "01bd" of the terminal 10bd and the session ID "se01" to the relaying apparatus 30a (Step S64-2). Upon acceptance of this relay request information, the relaying apparatus 30a transmits relay permission information that includes the terminal ID "01bd" of the terminal 10bd and the session ID "se01" and indicates permission to start relaying to the controller 50b (Step S65-2). The transmitter/receiver 51 of the controller 50b transmits the received relay permission information to the terminal 10bd (Step S66-2). This establishes the session sed for content data between the terminal 10bd and the relaying apparatus 30a. Upon establishment of the respective sessions sed for content data, the relaying apparatus 30a relays the content data including image data and voice data transmitted from one of the terminals (10aa, 10bd) to the other, thereby starting a teleconference.

Participation

Figure 28:
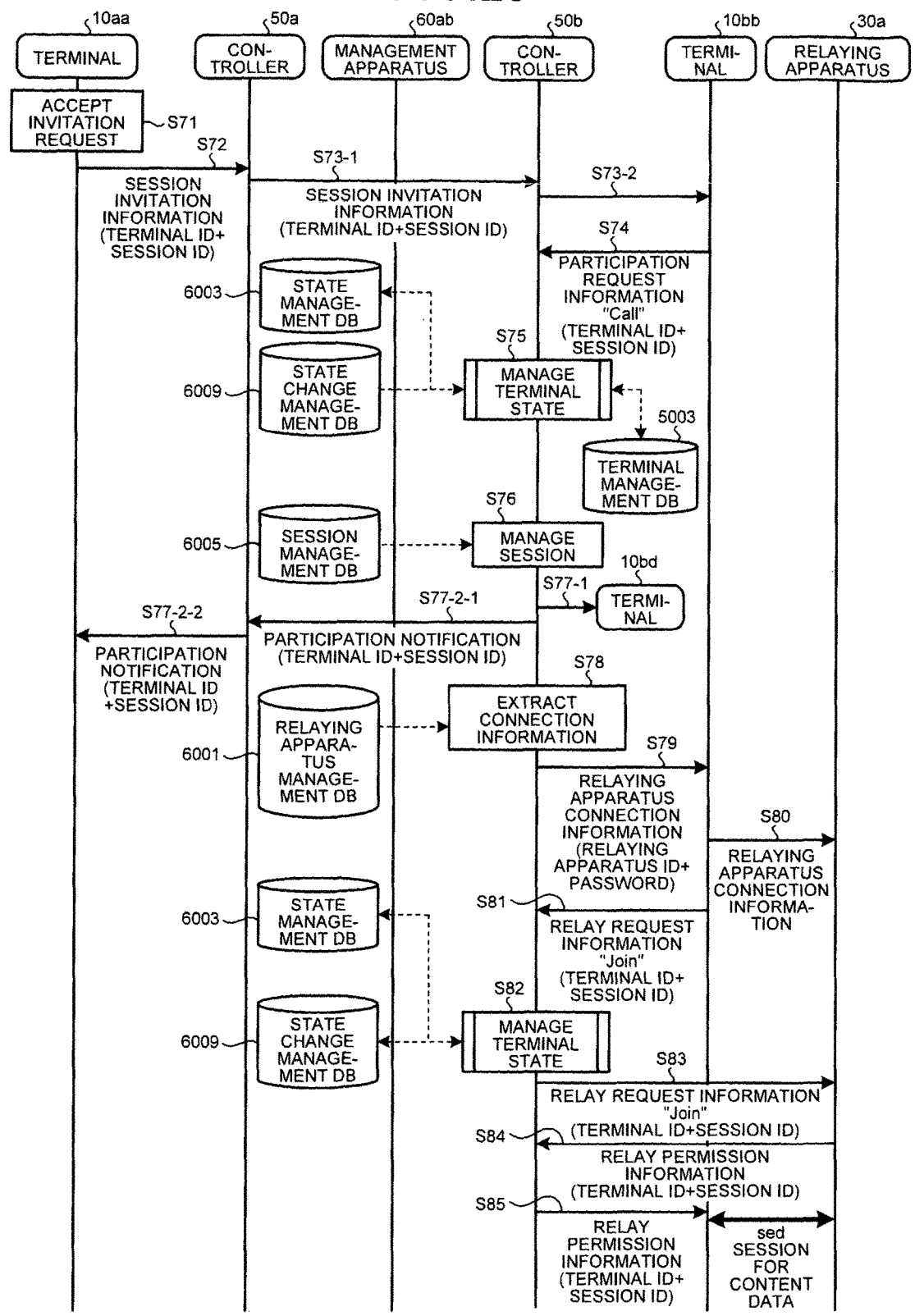
FIG. 28 is a sequence diagram illustrating processing to start communication among three terminals.

The following describes processing to start communication among three terminals 10 through the participation of the terminal 10bb in the session sed for content data after the session sed for content data has been established between the terminal 10aa and the terminal 10bd with reference to FIG. 28. FIG. 28 is a sequence diagram illustrating processing to start communication among the three terminals. In the communication between the terminal 10 and the controller 50 in FIG. 28, various types of management information is transmitted and received by the session sei for management information.

First, the user of the terminal 10aa that is performing communication with the terminal 10bd presses down the operation button 108 illustrated in FIG. 3, thereby causing the operation input accepting unit 12 to accept a request to invite the terminal 10bb to the session in communication (Step S71). Next, the transmitter/receiver 11 of the terminal 10aa transmits session invitation information that includes the terminal ID "01aa" of the terminal 10aa, the terminal ID "01bb" of the terminal 10bb, and the session ID "se01" and indicates invitation to the session in communication to the controller 50a (Step S72). The session ID may be identification such as conference ID, communication ID, and call ID identifying events such as a conference, communication, a call corresponding to the session sed for content data. The transmitter/receiver 51 of the controller 50a transmits the received session invitation information to the terminal 10bb via the controller 50b (Steps S73-1, S73-2). The terminal ID of the terminal 10bb as the transmission destination of the session invitation information includes the domain information "jp2.oo.com," and the transmitter/receiver 51 can transmit the session invitation information via the controller 50b based on this domain information.

In response to this invitation, the transmitter/receiver 11 of the terminal 10bb transmits participation request information "Call" indicating a request to participate in this session to the controller 50b (Step S74). This participation request information includes the terminal ID "01bb" of the terminal 10bb that requests to participate in this session and the session ID "se01@jp.oo.com." This causes the transmitter/receiver 51 of the controller 50b to accept the request to participate in the session sed for content data from the terminal 10bb.

The first changing unit 53a of the state management unit 53 of the controller 50b changes the state information of the terminal 10bb managed in the terminal management table (FIG. 16B) into "Accepted" based on the participation request information "Call" transmitted from the terminal 10bb (Step S75). Processing to change the state information of the terminal 10 is similar to the processing at Step S51, and the detailed description thereof is omitted.

After the state information managed in the state management table (refer to FIG. 8) is changed, if the new terminal 10 transmits login request information to the controller selecting apparatus 40ab, a load related to the control is calculated based on the post-change state information.

After the state information of the terminal 10bb is changed by the first changing unit 53a of the controller 50a, the first changing unit 53a changes the operation state of the terminal 10bb managed in the terminal management table (refer to FIG. 16) from "Online" into "Online (in conference)." The changed operation state is synchronized between the controller 50a and the controller 50b according to the processing at Step S31b to Step S34b.

The session management unit 57 of the controller 50b adds the terminal ID "01bb" of the terminal 10bb that requests participation in a destination terminal field of a record including the session ID "se01" in the session management table (refer to FIGS. 13A and 13B) (Step S76). In this case, the session management unit 57 of the controller 50b transmits the above session ID and terminal ID to the management apparatus 60ab via the transmitter/receiver 51, thereby requesting to record these pieces of information in the session management table. The storage/reading processing unit 69 of the management apparatus 60ab records the terminal ID "01bb" in the session management table in association with the destination terminal field of the record including the session ID "se01".

The transmitter/receiver 51 of the controller 50b transmits participation notification including the terminal ID "01bb" of the terminal 10bb participating in the session sed for content data and the session ID "se01" to the terminal 10aa and the terminal 10bd that are performing communication in this session (Steps S77-1, S77-2-1, S77-2-2). This enables the terminal 10aa and the terminal 10bd to grasp the participation of the terminal 10bb in the session sed for content data.

The session management unit 57 searches the relaying apparatus management table (FIGS. 10A and 10B) with the relaying apparatus ID "111a" of the selected relaying apparatus 30a as a key, thereby extracting the corresponding password "xxxx" (Step S78). In this case, the session management unit 57 of the controller 50b transmits the above session ID and relaying apparatus ID to the management apparatus 60ab via the transmitter/receiver 51, thereby requesting to provide notification of the corresponding password for connecting to the relaying apparatus 30a. The extracting unit 64 of the management apparatus 60ab extracts the password corresponding to the relaying apparatus ID from the relaying apparatus management table. The extracted password is transmitted to the controller 50b by the transmitter/receiver 61.

The transmitter/receiver 51 of the controller 50b transmits the relaying apparatus connection information for connecting to the relaying apparatus 30a that relays the content data in this session to the terminal 10bb. The relaying apparatus connection information includes the relaying apparatus ID "111a" of the relaying apparatus 30a and the password "xxxx" for connecting to the relaying apparatus 30a managed in the relaying apparatus management table (refer to FIG. 10A) (Step S79).

Then, by performing processing similar to the processing at Steps S61-2 to S66-2, the session sed for content data between the terminal 10bb and the relaying apparatus 30a is established (Steps S80 to S85). Upon establishment of this session, the relaying apparatus 30a can relay the content data among the terminals (10aa, 10bb, 10bd). This enables the terminals (10aa, 10bb, 10bd) to start a teleconference.

End

Figure 29:
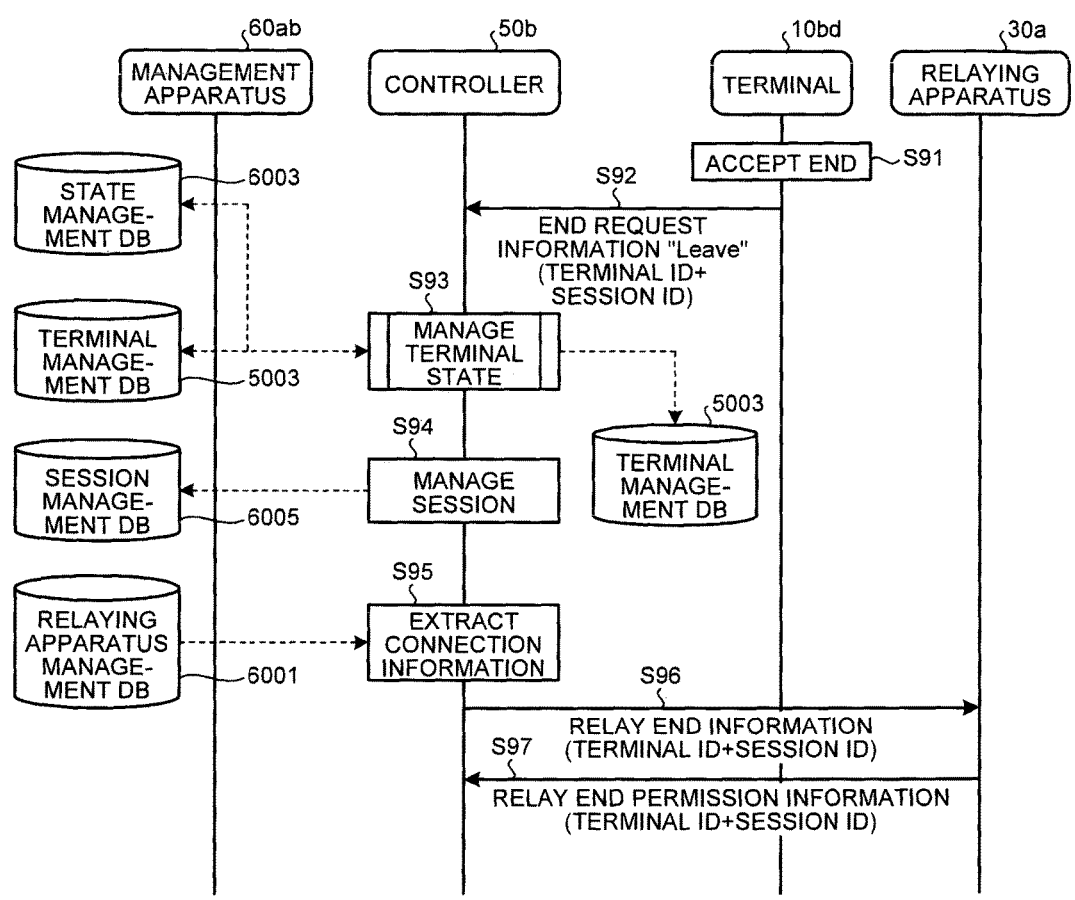
FIG. 29 is a sequence diagram illustrating processing to end communication.

The following describes processing in which, after the session sed for content data has been established among the terminals (10*aa*, 10*bb*, 10*bd*), the terminal 10*bd* leaves the session sed for content data to end communication with reference to FIG. 29. FIG. 29 is sequence diagram illustrating processing to end communication. FIG. 29 illustrates processing to transmit and receive various types of management information by the session sei for management information.

First, the user of the terminal 10*bd* presses down the operation button 108 illustrated in FIG. 4, thereby accepting a request to end communication (Step S91). The transmitter/receiver 11 of the terminal 10*bd* transmits end request information "Leave" including the terminal ID "01bd" of the terminal 10*bd* and the session ID "se01@jp.oo.com" identifying the session sed for content data used in this communication to the controller 50*b* (Step S92). This causes the transmitter/receiver 51 of the controller 50*b* to accept the request to end communication from the terminal 10*bd*.

The first changing unit of the state management unit 53 of the controller 50*b* changes the state information of the terminal 10*bd* managed in the terminal management table (FIG. 16B) into "None" based on the participation request information "Leave" transmitted from the terminal 10*bd* (Step S93). Processing to change the state information of the terminal 10 is similar to the processing at Step S51, and the detailed description thereof is omitted.

After the state information managed in the state management table (refer to FIG. 8) is changed, if the new terminal 10 transmits login request information to the controller selecting apparatus 40*ab*, a load related to the control is calculated based on the post-change state information.

After the state information of the terminal 10*bd* is changed by the first changing unit 53*a* of the controller 50*b*, the first changing unit 53*a* changes the operation state of the terminal 10*bd* managed in the terminal management table from "Online (in conference)" into "Online." The changed operation state is synchronized between the controller 50*b* and the controller 50*a* according to the processing at Step S31*b* to Step S34*b*.

The session management unit 57 deletes the terminal ID "01bd" of the terminal 10*bd* from the terminal ID field of the record including the session ID "se01" in the session management table (refer to FIGS. 13A and 13B) (Step S94). In this case, the session management unit 57 of the controller 50*b* transmits the above session ID and terminal ID to the management apparatus 60*ab* via the transmitter/receiver 51, thereby requesting to delete the terminal ID managed in the session management table. The storage/reading processing unit 69 of the management apparatus 60*ab* deletes the terminal ID "01bd" from the destination terminal field of the record including the session ID "se01" in the session management table.

The session management unit 57 searches the relaying apparatus management table (FIG. 10) with the relaying apparatus ID "111a" of the selected relaying apparatus 30*a* as a key, thereby extracting the corresponding password "xxxx" (Step S95). In this case, the session management unit 57 of the controller 50*b* transmits the above session ID and relaying apparatus ID to the management apparatus 60*ab* via the transmitter/receiver 51, thereby providing notification of the corresponding password. The extracting unit 64 of the management apparatus 60*ab* extracts the password corresponding to the relaying apparatus ID from the relaying apparatus management table, and the transmitter/receiver 61 transmits the extracted password to the controller 50*b*.

The transmitter/receiver 51 transmits relay end information to end relaying including the terminal ID "01bd" of the terminal 10*bd* and the session ID "se01" to the relaying apparatus 30*a* (Step S96). The relaying apparatus 30*a* then transmits relay end permission information that includes the terminal ID "01bd" and the session ID "se01" and permits to end relaying to the controller 50*b* (Step S97). This causes the relaying apparatus 30*a* to stop the relay of the content data transmitted from the terminal 10*bd* to the terminals (10*aa*, 10*bb*) and the relay of the content data transmitted from the terminals (10*aa*, 10*bb*) to the terminal 10*bd* (Step S96). This causes the terminal 10*bd* to end the communication with the terminals (10*aa*, 10*bd*) and to leave the session sed for content data.

Supplemental

The controller selecting apparatus 40, the controller 50, the management apparatus 60, the relaying apparatus selecting apparatus 80, and the program providing system 90 of the above embodiment may be constructed by a single computer and may be constructed by a plurality of computers to which divided components (functions or means) are arbitrarily assigned. When the program providing system 90 is constructed by a single computer, the program to be transmitted by the program providing system 90 may be transmitted after being divided into a plurality of modules and may be transmitted without being divided. When the program providing system 90 is constructed by a plurality of computers, a plurality of modules may be transmitted from the respective computers in a divided manner.

Partial or the entire functions or units provided in any of the controller selecting apparatus 40, the controller 50, the management apparatus 60, and the relaying apparatus selecting apparatus 80 in the above embodiments may be provided in another apparatus. For example, the state management DB provided in the management apparatus 60 is provided in the controller selecting apparatus 40, thereby enabling the controller selecting apparatus 40 to select the controller 50 without acquiring the state information from the management apparatus 60.

Recording media storing therein the program for controller selecting apparatuses, the program for controllers, the program for management apparatuses, the program for a relaying apparatus selecting apparatus, the program for terminals, the program for relaying apparatuses, and the program for communication management, the HD 204 storing therein these programs, and the program providing system 90 including the HD 204 are all used when they are provided to domestic or overseas users or the like of the above program for terminals, program for relaying apparatuses, and program for communication management as program products.

The above embodiment may manage the fully qualified domain names (FQDN) of the respective pieces of domain information. In this case, IP addresses corresponding to the FQDNs are acquired by a known domain name system (DNS) server. The ID such as the terminal ID and the relaying apparatus ID may be denoted as, for example, "relaying apparatus connection destination information indicating the connection destination to the relaying apparatus 30 on the communication network 2," "relaying apparatus destination information indicating the destination to the relaying apparatus 30 on the communication network 2," "terminal connection destination information indicating the connection destination to the terminal 10 on the communication network 2," or "terminal destination information indicating the destination to the terminal 10 on the communication network 2."

Each of the controllers 50 may transmit connection availability information indicating whether the new terminal 10 can be connected to the corresponding controller 50 to the controller selecting apparatus 40. In this case, the selecting unit 46 of the controller selecting apparatus 40 can select the controller 50 having the smallest degree of load out of connectable controllers 50 based on the connection availability information.

If there is a plurality of controllers 50 having the smallest degree of load, the selecting unit 46 of the controller selecting apparatus 40 can select the controller 50 out of the controllers 50 having the smallest degree of load by a known method. Examples of the method include the Round-Robin method.

In the present embodiment, the "teleconference" is used as a term replaceable with a "videoconference." Although the above embodiment describes the teleconference system as an example of the communication system 1, it is not limiting and may be a telephone system such as Internet Protocol (IP) telephone and Internet telephone. The communication system 1 may be a car navigation system. In this case, for example, one terminal 10 corresponds to a car navigation apparatus installed in a car, whereas another terminal 10 corresponds to a management terminal or a management server of a management center managing the car navigation or a car navigation apparatus installed in another car. The communication system 1 may also be a voice conference system or a personal computer (PC) screen sharing system.

Figure 30:
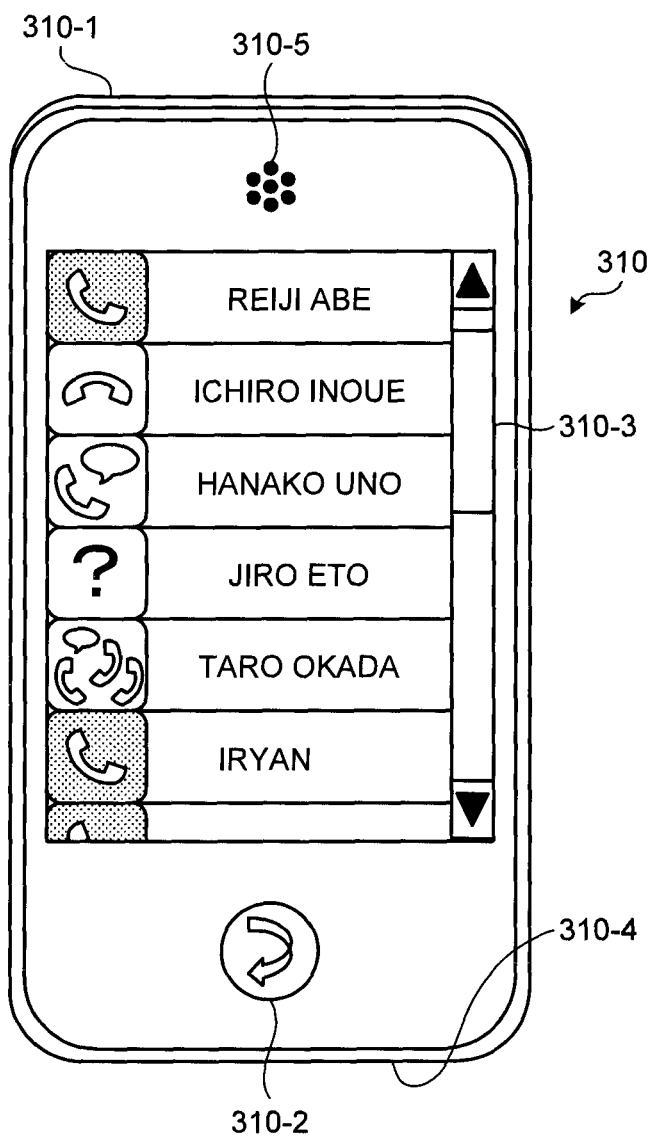
FIG. 30 is a conceptual diagram illustrating a destination list of another embodiment.

The communication system 1 may be a communication system of mobile phones. In this case, the terminal corresponds to a mobile phone, for example. A display example of a destination list for this case is illustrated in FIG. 30. FIG. 30 is a conceptual diagram illustrating a destination list of another embodiment. Specifically, a terminal 310 as a mobile phone includes a main body 310-1 of the mobile phone, a menu screen display button 310-2 arranged on the main body 310-1, a display unit 310-3 arranged on the main body 310-1, a microphone 310-4 arranged on the lower part of the main body 310-1, and a speaker 310-5 arranged on the main body 310-1. Among these, the "menu screen display button" 310-2 is a button for displaying a menu screen displaying icons indicating various applications. The display unit 310-3 is formed as a touch panel and can perform communication with another mobile phone through the selection of a destination name by a user.

Although the above embodiment describes a case of Performing a teleconference by the communication system 1, it is not limiting and may be used in meetings, general conversations such as ones between members of a family or friends, or unidirectional information provision.

As described above, the selecting system according to the present invention selects a controller to be connected to a communication terminal as a connection requester terminal based on the state of communication of a communication terminal connected to the controller. In this case, the degree of load related to the control to be performed in each state is managed by the load management unit, resulting in the effect of enabling a controller with a smaller load to be easily selected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST

1 Communication system
10 Communication terminal
11 Transmitter/receiver
12 Operation input accepting unit
13 Login requesting unit
14 Imaging unit
15a Voice input unit
15b Voice output unit
16 Display controller
19 Storage/reading processing unit
20 Destination list creating unit
30 Relaying apparatus
31 Transmitter/receiver
32 Relaying unit
39 Storage/reading processing unit
40 Controller selecting apparatus (an example of a selecting unit)
41 Transmitter/receiver (an example of an accepting unit)
44 Extracting unit
45 Load calculating unit (an example of a calculating unit)
46 Selecting unit (an example of a selecting unit)
49 Storage/reading processing unit
50 Controller
51 Transmitter/receiver (an example of a transmitter)
52 Authenticating unit
53 State management unit
53a First changing unit
53b Second changing unit
54 Extracting unit
57 Session management unit
58 Identifying unit
59 Storage/reading processing unit
60 Management apparatus
61 Transmitter/receiver
64 Extracting unit
69 Storage/reading processing unit
70 Router
80 Relaying apparatus selecting apparatus
81 Transmitter/receiver
82 Selecting unit
89 Storage/reading processing unit
90 Program providing system
100 Maintenance system
120 Display
500 Communication management system
1000 Storage unit
3000 Storage unit
4000 Storage unit
4002 Load management DB (an example of a load management unit)
5000 Nonvolatile storage unit
5003 Terminal management DB
5100 Volatile storage unit
6000 Storage unit
6001 Relaying apparatus management DB
6002 Terminal authentication management DB
6003 State management DB (an example of a state management unit)
6004 Destination list management DB
6005 Session management DB
6009 State change management DB
8001 Relaying apparatus selection management DB

CITATION LIST

Patent Literature

Patent Literature 1: Japanese Laid-open Patent Publication No. 2012-50063
Patent Literature 2: Japanese Laid-open Patent Publication No. 2008-71156

The invention claimed is:

1. A selecting system that, when a plurality of controllers that control a session between communication terminals are provided, selects a controller to be connected to a requesting communication terminal out of the plurality of controllers, the selecting system comprising:
a state management memory that stores, for each controller of the plurality of controllers, state information indicating, for each communication terminal connected to the controller, a state of communication of the communication terminal;
a load management memory that stores, for each state of communication, load information indicating a degree of load related to control to be performed in the corresponding state of communication, wherein the load information stored by the load management memory includes first load information corresponding to a first state in which the communication terminal is in communication with another communication terminal and second load information corresponding to a second state in which the communication terminal is not in communication with any other communication terminal, and the degree of load indicated by the first load information is larger than the degree of load indicated by the second load information; and
processing circuitry configured to
accept a connection request from the requesting communication terminal that is not connected;
calculate, for each controller of the plurality of controllers, the degree of load related to the control based on the state of communication of each communication terminal connected to the controller and the load information for each state of communication stored in the load management memory; and
select a specific controller to be connected to the requesting communication terminal, based on the degree of load calculated for each of the plurality of controllers.

2. The selecting system according to claim 1, wherein the degree of load includes at least one of information indicating a numeric value of a magnitude of load, information indicating a level of the magnitude of load, and information indicating a step of the magnitude of load.

3. The selecting system according to claim 1, wherein the processing circuitry is further configured to calculate, for each controller of the plurality of controllers, a load related to the control based on a number of communication terminals connected to the controller.

4. The selecting system of claim 1, wherein the load management memory stores a load management table that contains the load information for each state of communication, the states of communication including at least one of ringing, accepted, inviting, invited, and busy, and wherein the load information indicates a relative magnitude of the load on any controller for a communication terminal in the corresponding state of communication.

5. A communication management system, comprising:
the selecting system according to claim 1; and
the plurality of controllers that control the session for transmitting content data between the communication terminals, based on a request from the requesting communication terminal.

6. The communication management system according to claim 5, wherein
each controller of the plurality of controllers comprises a transmitter that, when the state of communication of a communication terminal connected to the controller is changed, is configured to transmit post-change state information indicating a post-change state, to the selecting system, and
the state management memory of the selecting system stores state information indicating the state of the communication terminal, based on the post-change state information transmitted from the controller.

7. The communication management system according to claim 6, wherein each transmitter is configured to transmit the post-change state information in association with domain information of the corresponding controller to the selecting system.

8. A communication system, comprising:
the communication management system according to claim 5; and
the requesting communication terminal, comprising a local transmitter configured to transmit, to the selecting system, connection request information indicating the connection request.

9. A computer program product comprising a non-transitory computer-readable medium including a computer program that causes the processing circuitry of the selecting system to perform the accenting, calculating, and selecting steps claimed in claim 1.

10. A method of selection performed in a selecting system including a state management memory that stores, for each controller of a plurality of controllers that controls a session between communication terminals, state information indicating, for each communication terminal connected to the controller, a state of communication of the communication terminal and a load management memory that stores, for each state of communication, load information indicating a degree of load related to control to be performed in the corresponding state of communication, the method comprising:
accepting a connection request from a requesting communication terminal that is not connected;
calculating, for each controller of the plurality of controllers, the degree of load related to the control based on the state of communication of each communication terminal connected to the controller and the load information for each state of communication stored in the load management memory; and
selecting a specific controller to be connected to the requesting communication terminal, based on the degree of load calculated for each of the plurality of controllers,
wherein the load information stored by the load management memory includes first load information corresponding to a first state in which the communication terminal is in communication with another communication terminal and second load information corresponding to a second state in which the communication terminal is not in communication with any other communication terminal, and the degree of load indicated by the first load information is larger than the degree of load indicated by the second load information.

11. The method of selection according to claim 10, further comprising causing each controller of the plurality of controllers to transmit, when the state of communication of a communication terminal connected to the controller is changed, post-change information indicating a post-change state, to the selecting system, wherein
the state management memory of the selecting system stores state information indicating the state of the communication terminal, based on the post-change state information transmitted from the controller.

12. The method of selection according to claim 10, further comprising causing the requesting communication terminal to transmit, to the selecting system, connection request information indicating the connection request.

13. A computer program product comprising a non-transitory computer-readable medium including a computer program that causes the controllers to control the session, as claimed in claim 5.

14. A computer program product comprising a non-transitory computer-readable medium including a computer program that causes the requesting communication terminal to implement the transmitting, as claimed in claim 8.

* * * * *

UNITED STATES PATENT AND TRADEMARK OFFICE
CERTIFICATE OF CORRECTION

PATENT NO. : 10,171,568 B2  
APPLICATION NO. : 15/032674  
DATED : January 1, 2019  
INVENTOR(S) : Naoki Umehara Page 1 of 1

It is certified that error appears in the above-identified patent and that said Letters Patent is hereby corrected as shown below:

On the Title Page

Item (22), the PCT filing date is incorrect. Item (22) should read:  
--(22) PCT Filed: Nov. 18, 2014--

Signed and Sealed this  
Eighteenth Day of February, 2020

Andrei Iancu  
*Director of the United States Patent and Trademark Office*